US012070851B2

(12) United States Patent
Geyer et al.

(10) Patent No.: US 12,070,851 B2
(45) Date of Patent: Aug. 27, 2024

(54) SYSTEMS AND METHODS FOR OBJECT PROCESSING USING A VACUUM GRIPPER THAT PROVIDES OBJECT RETENTION BY EVACUATION

(71) Applicant: Berkshire Grey Operating Company, Inc., Bedford, MA (US)

(72) Inventors: Christopher Geyer, Arlington, MA (US); Matthew T. Mason, Pittsburgh, PA (US); Gabriel Nelson, Wilmington, MA (US); Aidan Rose, Waban, MA (US); Jason Yap, Newton, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 99 days.

(21) Appl. No.: 17/376,998

(22) Filed: Jul. 15, 2021

(65) Prior Publication Data
US 2022/0024705 A1 Jan. 27, 2022

Related U.S. Application Data

(60) Provisional application No. 63/054,904, filed on Jul. 22, 2020.

(51) Int. Cl.
*B25J 15/06* (2006.01)
*B25J 15/00* (2006.01)
(Continued)

(52) U.S. Cl.
CPC ....... *B25J 15/0683* (2013.01); *B25J 15/0028* (2013.01); *B65G 47/91* (2013.01); *B25J 9/0093* (2013.01)

(58) Field of Classification Search
CPC .................................................. B25J 15/0683
See application file for complete search history.

(56) References Cited

U.S. PATENT DOCUMENTS 1,411,420 A 4/1922 Donnelly
2,702,038 A 1/1954 Uddenberg et al.
(Continued)

FOREIGN PATENT DOCUMENTS

CN 101282824 A 10/2008
CN 104057460 A 9/2014
(Continued)

OTHER PUBLICATIONS

Notification of Transmittal of the International Search Report and The Written Opinion of the International Searching Authority, and the International Search Report and Written Opinion, issued by the European Patent Office (as the International Searching Authority) in related International Application No. PCT/US2021/041838 on Nov. 22, 2021, 15 pages.

(Continued)

*Primary Examiner* — Ronald P Jarrett
(74) *Attorney, Agent, or Firm* — Gesmer Updegrove LLP

(57) ABSTRACT

An end-effector of a programmable motion device is disclosed. The end-effector includes a body that provides an open interior, the open interior being coupled to a vacuum source, and the body including a contact surface for contacting an object to be grasped by the end effector. The contact surface is at least partially defining an aperture, and the body includes a flexible portion that permits at least a portion of the contact surface to be drawn at least partially into the open interior of the body when a flow of air drawn by the vacuum source through the aperture is reduced due to the aperture being at least partially blocked.

20 Claims, 23 Drawing Sheets

(51) Int. Cl.
*B65G 47/91* (2006.01)
*B25J 9/00* (2006.01)

(56) References Cited

U.S. PATENT DOCUMENTS

| | | |
|---|---|---|
| 2,853,333 A | 9/1955 | Littell |
| 2,916,059 A | 12/1959 | Wong |
| 3,005,652 A | 10/1961 | Helm |
| 3,195,941 A | 7/1965 | Morey |
| 3,637,249 A | 1/1972 | Kuhl et al. |
| 3,651,957 A | 3/1972 | Ball et al. |
| 3,656,794 A | 4/1972 | McCord |
| 3,720,433 A | 3/1973 | Rosfelder |
| 3,743,340 A | 7/1973 | Williamann |
| 3,901,502 A | 8/1975 | Vits |
| 4,243,040 A | 1/1981 | Beecher |
| 4,340,249 A | 7/1982 | Bucklew |
| 4,381,601 A | 5/1983 | Tamai et al. |
| 4,389,064 A | 6/1983 | Laverriere |
| 4,412,775 A | 11/1983 | Molitor et al. |
| 4,469,100 A | 9/1984 | Hardwick |
| 4,473,247 A | 9/1984 | Itemadani et al. |
| 4,505,505 A | 3/1985 | Senaratne |
| 4,557,659 A | 12/1985 | Scaglia |
| 4,561,686 A | 12/1985 | Atchley |
| 4,578,013 A | 3/1986 | Barillec et al. |
| 4,653,793 A | 3/1987 | Guinot et al. |
| 4,677,778 A | 7/1987 | Sorimachi et al. |
| 4,681,063 A | 7/1987 | Hebrank |
| 4,729,713 A | 3/1988 | Takaichi et al. |
| 4,828,304 A | 5/1989 | No et al. |
| 4,850,627 A | 7/1989 | Franklin |
| 4,858,974 A | 8/1989 | Stannek |
| 4,917,427 A | 4/1990 | Scaglia |
| 5,024,575 A | 6/1991 | Anderson |
| 5,127,692 A | 7/1992 | Yakou et al. |
| 5,190,332 A | 3/1993 | Nagai et al. |
| 5,192,070 A | 3/1993 | Nagai et al. |
| 5,207,465 A | 5/1993 | Rich |
| 5,226,757 A | 7/1993 | Tarrant |
| 5,263,753 A | 11/1993 | Breu et al. |
| 5,344,202 A | 9/1994 | Ramler et al. |
| 5,542,726 A | 8/1996 | Ozawa |
| 5,564,893 A | 10/1996 | Tacchi et al. |
| 5,752,729 A | 5/1998 | Crozier et al. |
| 5,764,013 A | 6/1998 | Yae |
| 5,777,267 A | 7/1998 | Szydel |
| 5,865,487 A | 2/1999 | Gore et al. |
| 5,865,827 A | 2/1999 | Bullister |
| 5,882,055 A | 3/1999 | Smith |
| 6,015,174 A | 1/2000 | Raes et al. |
| 6,167,607 B1 | 1/2001 | Pryor |
| 6,193,291 B1 | 2/2001 | Morroney |
| 6,244,640 B1 | 6/2001 | Le Bricquer et al. |
| 6,517,130 B1 | 2/2003 | Donoso et al. |
| 6,721,444 B1 | 4/2004 | Gu et al. |
| 6,817,639 B2 | 11/2004 | Schmalz |
| 6,846,029 B1 | 1/2005 | Ragner et al. |
| 6,994,387 B1 | 2/2006 | Ragner et al. |
| 7,000,964 B1 | 2/2006 | Porras et al. |
| 7,004,524 B2 | 2/2006 | Marshall |
| 7,017,961 B1 | 3/2006 | Parnell et al. |
| 7,140,389 B2 | 11/2006 | Schnatterer et al. |
| 7,263,890 B2 | 9/2007 | Takahashi |
| 7,311,489 B2 | 12/2007 | Ekman |
| 7,313,464 B1 | 12/2007 | Perreault et al. |
| 7,474,939 B2 | 1/2009 | Oda et al. |
| 7,481,472 B2 | 1/2009 | Cawley et al. |
| 7,618,074 B2 | 11/2009 | Zimmer |
| 7,677,622 B2 | 3/2010 | Dunkmann et al. |
| 7,785,422 B2 | 8/2010 | Autumn et al. |
| 8,070,203 B2 | 12/2011 | Schaumberger |
| 8,096,598 B2 | 1/2012 | Perlman |
| 8,132,835 B2 | 3/2012 | Ban et al. |
| 8,162,362 B2 | 4/2012 | Braunschweiger et al. |
| 8,251,415 B2 | 8/2012 | Lomerson, Jr. |
| 8,267,386 B2 | 9/2012 | Schaaf et al. |
| 8,414,042 B2 | 4/2013 | Landes et al. |
| 8,548,626 B2 | 10/2013 | Steltz et al. |
| 8,560,121 B2 | 10/2013 | Hjørnet |
| 8,777,284 B2 | 7/2014 | Schaller et al. |
| 8,874,270 B2 | 10/2014 | Ando |
| 8,960,751 B2 | 2/2015 | Regan et al. |
| 9,061,868 B1 | 6/2015 | Paulsen et al. |
| 9,120,622 B1 | 9/2015 | Elazary et al. |
| 9,227,323 B1 | 1/2016 | Konolige et al. |
| 9,259,844 B2 | 2/2016 | Xu et al. |
| 9,266,237 B2 | 2/2016 | Nomura |
| 9,283,680 B2 | 3/2016 | Yasuda et al. |
| 9,457,477 B1 | 10/2016 | Rublee et al. |
| 9,486,926 B2 | 11/2016 | Kawano |
| 9,492,923 B2 | 11/2016 | Wellman et al. |
| 9,604,363 B2 | 3/2017 | Ban |
| 9,623,570 B1 | 4/2017 | Krahn et al. |
| 9,656,813 B2 | 5/2017 | Dunkmann et al. |
| 9,981,379 B1 | 5/2018 | Youmans et al. |
| 9,999,977 B2 | 6/2018 | Wagner et al. |
| 10,011,020 B2 | 7/2018 | Wagner et al. |
| 10,086,519 B2 | 10/2018 | Wagner et al. |
| 10,118,300 B2 | 11/2018 | Wagner et al. |
| 10,315,315 B2 | 6/2019 | Wagner et al. |
| 10,335,956 B2 | 7/2019 | Wagner et al. |
| 10,357,883 B1 | 7/2019 | O'Connor et al. |
| 10,668,630 B2 | 6/2020 | Robinson et al. |
| 10,850,402 B2 | 12/2020 | Wagner et al. |
| 11,426,882 B2 * | 8/2022 | Takahashi ............ B25J 15/12 |
| 2001/0045755 A1 | 11/2001 | Schick et al. |
| 2003/0038491 A1 | 2/2003 | Schmalz et al. |
| 2003/0160470 A1 | 8/2003 | Marshall |
| 2003/0164620 A1 | 9/2003 | Schmalz et al. |
| 2004/0169386 A1 | 9/2004 | Shuttleworth |
| 2004/0232716 A1 | 11/2004 | Reed et al. |
| 2006/0242785 A1 | 11/2006 | Cawley et al. |
| 2006/0267360 A1 | 11/2006 | Kiaie et al. |
| 2008/0179224 A1 | 7/2008 | Van Bossuyt |
| 2009/0019818 A1 | 1/2009 | Gilmore et al. |
| 2010/0040450 A1 | 2/2010 | Parnell |
| 2010/0078953 A1 | 4/2010 | Ban et al. |
| 2010/0079853 A1 | 4/2010 | Rakich et al. |
| 2010/0103960 A1 | 4/2010 | Kasamatsu et al. |
| 2010/0109360 A1 | 5/2010 | Meisho |
| 2010/0175487 A1 | 7/2010 | Sato |
| 2010/0180711 A1 | 7/2010 | Kilibarda et al. |
| 2010/0241260 A1 | 9/2010 | Kilibarda et al. |
| 2011/0126681 A1 | 6/2011 | Blanchet et al. |
| 2012/0319416 A1 | 12/2012 | Ellis et al. |
| 2013/0110280 A1 | 5/2013 | Folk |
| 2013/0129464 A1 | 5/2013 | Regan et al. |
| 2013/0232918 A1 | 9/2013 | Lomerson, Jr. |
| 2013/0277999 A1 | 10/2013 | Schaller et al. |
| 2014/0005831 A1 | 1/2014 | Naderer et al. |
| 2014/0067121 A1 | 3/2014 | Brooks et al. |
| 2014/0067127 A1 | 3/2014 | Gotou |
| 2014/0105719 A1 | 4/2014 | Mueller et al. |
| 2014/0260678 A1 | 9/2014 | Jentoft et al. |
| 2015/0032252 A1 | 1/2015 | Galluzzo |
| 2015/0073589 A1 | 3/2015 | Khodl et al. |
| 2015/0081090 A1 | 3/2015 | Dong |
| 2015/0298316 A1 | 10/2015 | Accou et al. |
| 2015/0306770 A1 | 10/2015 | Mittal et al. |
| 2015/0328779 A1 | 11/2015 | Bowman et al. |
| 2015/0375401 A1 | 12/2015 | Dunkmann et al. |
| 2016/0136816 A1 | 5/2016 | Pistorino |
| 2016/0167227 A1 | 6/2016 | Wellman et al. |
| 2016/0221187 A1 | 8/2016 | Bradski et al. |
| 2016/0243704 A1 | 8/2016 | Vakanski et al. |
| 2016/0258473 A1 | 9/2016 | Koop et al. |
| 2016/0271805 A1 | 9/2016 | Kuolt et al. |
| 2017/0021499 A1 | 1/2017 | Wellman et al. |
| 2017/0036354 A1 | 2/2017 | Chavan Dafle et al. |
| 2017/0050315 A1 | 2/2017 | Henry et al. |
| 2017/0057091 A1 | 3/2017 | Wagner et al. |
| 2017/0080571 A1 | 3/2017 | Wagner et al. |
| 2017/0080579 A1 | 3/2017 | Wagner et al. |

(56) References Cited

U.S. PATENT DOCUMENTS

| | | |
|---|---|---|
| 2017/0087718 A1 | 3/2017 | Wagner et al. |
| 2017/0087731 A1 | 3/2017 | Wagner et al. |
| 2017/0106532 A1 | 4/2017 | Wellman et al. |
| 2017/0120455 A1 | 5/2017 | Wagner et al. |
| 2017/0121113 A1 | 5/2017 | Wagner et al. |
| 2017/0136632 A1 | 5/2017 | Wagner et al. |
| 2018/0117773 A1 | 5/2018 | Odhner et al. |
| 2018/0281202 A1 | 10/2018 | Brudniok et al. |
| 2019/0030727 A1 | 1/2019 | Nagata et al. |
| 2019/0061174 A1 | 2/2019 | Robinson et al. |
| 2019/0084152 A1 | 3/2019 | Deacon |
| 2019/0240847 A1 | 8/2019 | Quast et al. |
| 2020/0048014 A1 | 2/2020 | Nakayama et al. |
| 2020/0078939 A1 | 3/2020 | Jeong et al. |
| 2020/0164506 A1 | 5/2020 | Hallock et al. |
| 2020/0215701 A1 | 7/2020 | Takahashi et al. |
| 2020/0261176 A1 | 8/2020 | Kapadia et al. |
| 2020/0269429 A1 | 8/2020 | Chavez et al. |
| 2020/0353628 A1 | 11/2020 | Russell et al. |
| 2020/0353629 A1 | 11/2020 | Simons et al. |
| 2020/0376659 A1 | 12/2020 | Diankov et al. |
| 2021/0122039 A1 | 4/2021 | Su et al. |
| 2021/0122056 A1 | 4/2021 | Menon et al. |
| 2021/0129354 A1 | 5/2021 | Wilson, II et al. |
| 2021/0260775 A1 | 8/2021 | Mizoguchi |
| 2021/0308874 A1 | 10/2021 | Gealy et al. |
| 2021/0308875 A1 | 10/2021 | Gealy et al. |
| 2022/0024056 A1 | 1/2022 | Yap et al. |
| 2022/0024057 A1 | 1/2022 | Yap et al. |
| 2022/0097237 A1 | 3/2022 | Brooks et al. |
| 2022/0219318 A1 | 7/2022 | Jeong et al. |
| 2022/0266458 A1 | 8/2022 | Fofonoff et al. |
| 2022/0297294 A1 | 9/2022 | Baek et al. |
| 2022/0339800 A1 | 10/2022 | Poteet et al. |
| 2022/0395987 A1 | 12/2022 | Hvass et al. |
| 2023/0075952 A1 | 3/2023 | Hallock et al. |

FOREIGN PATENT DOCUMENTS

| | | |
|---|---|---|
| DE | 254703 A1 | 3/1988 |
| DE | 3810989 A | 8/1989 |
| DE | 20003962 U1 | 6/2000 |
| DE | 10121344 A1 | 11/2002 |
| DE | 102005018207 A1 | 10/2006 |
| DE | 102010002317 A1 | 8/2011 |
| DE | 202012008988 U1 | 10/2012 |
| DE | 102012009011 A1 | 12/2012 |
| EP | 0613841 A1 | 9/1994 |
| EP | 1151942 A2 | 11/2001 |
| EP | 1256421 B1 | 11/2002 |
| EP | 1369364 A1 | 12/2003 |
| EP | 1473014 A1 | 11/2004 |
| EP | 1348873 B1 | 12/2004 |
| EP | 1671906 A1 | 6/2006 |
| EP | 2014587 A2 | 1/2009 |
| EP | 2181814 A1 | 5/2010 |
| EP | 2383211 A1 | 11/2011 |
| EP | 2677078 A1 | 12/2013 |
| EP | 2796263 A2 | 10/2014 |
| EP | 2960024 A2 | 12/2015 |
| FR | 2527968 A1 | 12/1983 |
| FR | 2592827 A1 | 3/1988 |
| JP | 6155399 A | 3/1986 |
| JP | H0769470 A | 3/1995 |
| JP | 2010201536 A | 9/2010 |
| JP | 2014200874 A | 10/2014 |
| JP | 2018130810 A | 8/2018 |
| JP | 2020089936 A | 6/2020 |
| WO | 2007024607 A2 | 3/2007 |
| WO | 2008005060 A2 | 1/2008 |
| WO | 2009007053 A1 | 1/2009 |
| WO | 2009056105 A1 | 5/2009 |
| WO | 2010034044 A2 | 4/2010 |
| WO | 2013158480 A1 | 10/2013 |
| WO | 2014161549 A1 | 10/2014 |
| WO | 2015121668 A1 | 8/2015 |
| WO | 2015123128 A1 | 8/2015 |
| WO | 2015162390 A1 | 10/2015 |
| WO | 2016070412 A1 | 5/2016 |
| WO | 2017035466 A1 | 3/2017 |
| WO | 2017036812 A1 | 3/2017 |
| WO | 2017044632 A1 | 3/2017 |
| WO | 2017119982 A1 | 7/2017 |
| WO | 2018017616 A1 | 1/2018 |
| WO | 2019102862 A1 | 5/2019 |

OTHER PUBLICATIONS

Notification of Transmittal of the International Search Report and The Written Opinion of the International Searching Authority, and the International Search Report and Written Opinion, issued by the European Patent Office (as the International Searching Authority) in related International Application No. PCT/US2021/041649 on Nov. 24, 2021, 17 pages.

Notification of Transmittal of the International Search Report and The Written Opinion of the International Searching Authority, and the International Search Report and Written Opinion, issued by the European Patent Office (as the International Searching Authority) in related International Application No. PCT/US2021/041846 on Nov. 22, 2021, 15 pages.

Notification of Transmittal of the International Search Report and The Written Opinion of the International Searching Authority, and the International Search Report and Written Opinion, issued by the European Patent Office (as the International Searching Authority) in related International Application No. PCT/US2021/041639 on Nov. 22, 2021, 15 pages.

Notification Concerning Transmittal of International Preliminary Report on Patentability and the International Preliminary Report on Patentability issued by the International Bureau of WIPO in International Application No. PCT/US2021/041846 on Feb. 2, 2023, 9 pages.

Notification Concerning Transmittal of International Preliminary Report on Patentability and the International Preliminary Report on Patentability issued by the International Bureau of WIPO in International Application No. PCT/US2021/041649 on Feb. 2, 2023, 11 pages.

Communication pursuant to Rules 161(1) and 162 EPC issued by the European Patent Office in related European Patent Application No. 21755136.5 on Mar. 1, 2023, 3 pages.

Notification Concerning Transmittal of International Preliminary Report on Patentability and the International Preliminary Report on Patentability issued by the International Bureau of WIPO in International Application No. PCT/US2021/041838 on Feb. 2, 2023, 10 pages.

Communication pursuant to Rules 161(1) and 162 EPC issued by the European Patent Office in related European Patent Application No. 21752372.9 on Mar. 1, 2023, 3 pages.

Notification Concerning Transmittal of International Preliminary Report on Patentability and the International Preliminary Report on Patentability issued by the International Bureau of WIPO in International Application No. PCT/US2021/041639 on Feb. 2, 2023, 9 pages.

Communication pursuant to Rules 161(1) and 162 EPC issued by the European Patent Office in related European Patent Application No. 21751935.4 on Mar. 1, 2023, 3 pages.

Communication pursuant to Rules 161(1) and 162 EPC issued by the European Patent Office in related European Patent Application No. 21755135.7 on Mar. 1, 2023, 3 pages.

Carlisle, et al., A Pivoting Gripper for Feeding Industrial Parts, IEEE 1994, pp. 1650-1755.

Herbert et al., A Robotic Gripper System for Limp Material Manipulation: Hardware and Software Development and Integration, Proc. Of IEEE, Int'l Conf on Robotics & Automation, Apr. 1997, pp. 15-21.

Klingbeil et al., Grasping with Application to an Autonomous Checkout Robot, retrieved from https://www.researchgate.net/publication/224252695 on Jul. 11, 2016, 9 pages.

(56) References Cited

OTHER PUBLICATIONS

Liu et al., Hard-Arm Coordination for a Tomato Harvesting Robot Based on Commercial Manipulator, Proc. Of IEEE—Int'l Conf. on Robotics and Biometrics, Dec. 2013, pp. 2715-2720.

Moura et al., Neural Network Based Perturbation Identification Approach for High Accuracy Tracking Control of Robotic Manipulators, Proc. Of IMECE—ASME Int'l Mech. Eng. Cong., Nov. 2003, pp. 189-197.

Non-Final Office Action issued by the United States Patent and Trademark Office in related U.S. Appl. No. 17/375,758 on May 10, 2023, 8 pages.

Non-Final Office Action issued by the United States Patent and Trademark Office in related U.S. Appl. No. 17/375,763 on May 10, 2023, 10 pages.

Non-Final Office Action issued by the United States Patent and Trademark Office in related U.S. Appl. No. 17/377,004 on May 10, 2023, 8 pages.

Vittor et al., Flexible Robotic Gripper for Automation of Assembly Tasks: A Technology Study on a Gripper for Operation in Shared Human Environment, Proc. Of ASME—Dynamic Sys. and Control Div., DSC—vol. 72-2, Nov. 2003, 7 pages.

\* cited by examiner

SYSTEMS AND METHODS FOR OBJECT PROCESSING USING A VACUUM GRIPPER THAT PROVIDES OBJECT RETENTION BY EVACUATION

PRIORITY

The present application claims priority to U.S. Provisional Patent Application Ser. No. 63/054,904 filed Jul. 22, 2020, the disclosure of which is hereby incorporated by reference in its entirety.

BACKGROUND

The invention generally relates to programmable motion systems and relates in particular to end effectors for programmable motion devices (i.e., robotic systems) for use in object processing such as object sortation and object distribution.

End effectors for robotic systems, for example, may be employed in certain applications to select and grasp an object, and then move the acquired object very quickly to a new location. End effectors that are designed to very securely grasp an object during movement may have limitations regarding how quickly and easily they may select and grasp an object from a jumble of dissimilar objects. Conversely, end effectors that may quickly and easily grasp a selected object from a jumble of dissimilar objects may have limitations regarding how securely they may grasp an acquired object during rapid movement, particularly rapid acceleration and deceleration (both angular and linear).

Many end effectors employ vacuum pressure for acquiring and securing objects for transport or subsequent operations by articulated arms. Vacuum grippers however, generally require having a good seal with an object, but ensuring a good seal sometimes requires that the particular suction cup be selected to correspond to the object being grasped. Additionally, grasping certain objects, such as plastic bags, may require a specific type of end effector to ensure that the plastic bag does nor peel off of the end effector or collapse under the force of the end effector and thereby break the bag and/or the seal. Further, the lifting force may be limited by an amount proportional to the area of contact of the suction cup in a vacuum system, and the vacuum itself may damage some objects.

Other techniques for acquiring and securing objects employ electrostatic attraction, magnetic attraction, needles for penetrating objects such as fabrics, fingers that squeeze an object, hooks that engage and lift a protruding feature of an object, and collets that expand in an opening of an object, among other techniques. Prehensile grippers, or finger-like grippers, for example, are sometimes used for grasping objects, but such systems also face challenges in certain applications. Such systems generally require two opposing surfaces in opposition to grasp an object, and finger-like grippers are mechanically complicated, typically requiring multiple parts as well as an actuation mechanism to close and open the fingers.

End effectors are generally designed as a single tool, such as for example, a gripper, a welder, or a paint spray head, and the tool is typically designed for a specific set of needs. There remains a need for an end effector in a programmable motion system that may select and grasp an object, and then move the acquired object very quickly to a new location.

SUMMARY

In accordance with an aspect, the invention provides an end-effector of a programmable motion device. The end-effector includes a body that provides an open interior, the open interior being coupled to a vacuum source, and the body including a contact surface for contacting an object to be grasped by the end effector. The contact surface is at least partially defining an aperture, and the body includes a flexible portion that permits at least a portion of the contact surface to be drawn at least partially into the open interior of the body when a flow of air drawn by the vacuum source through the aperture is reduced due to the aperture being at least partially blocked.

In accordance with another aspect, the invention provides an end-effector of a programmable motion device, where the end-effector includes a body that provides an open interior. The open interior is coupled to a vacuum source, and the body includes a contact surface for contacting an object to be grasped by the end effector. The contact surface at least partially defines an aperture, and the body includes a curved flexible portion with an outer surface that faces away from the open interior, and the curved flexible portion provides that when the flow of air drawn by the vacuum source through the aperture is reduced due to the aperture being at least partially blocked, and the outer surface of the curved flexible portion faces the object being grasped at least partially within the open interior of the body In accordance with a further aspect, the invention provides a method of applying an end-effector of a programmable motion device to an object. The method includes providing an end-effector including a body that provides an open interior, the open interior being coupled to a vacuum source, and the body including a contact surface for contacting an object to be grasped by the end effector, said contact surface at least partially defining an aperture, engaging the contact surface of the flexible body to the object, and permitting at least a portion of the contact surface of the flexible body to be drawn at least partially into the open interior of the body when a flow of air drawn by the vacuum source through the aperture is reduced due to the aperture being at least partially blocked.

BRIEF DESCRIPTION OF THE DRAWINGS

The following description may be further understood with reference to the accompanying drawings in which.

The drawings are show for illustrative purposes only.

DETAILED DESCRIPTION

In accordance with an aspect, the invention provides an end-effector of a programmable motion device that includes a body that provides an open interior. The open interior is coupled to a vacuum source, and the body includes a contact surface for contacting an object to be grasped by the end effector. The contact surface at least partially defines an aperture, and the body includes a flexible portion that permits the contact surface to be drawn at least partially into the open interior of the body when a flow of air drawn by the vacuum source through the aperture is reduced due to the aperture being at least partially blocked. In accordance with further aspects, the flexible portion provides a joint region about which an outer surface adjacent the contact surface may move inward into the open interior. In further aspects the outer surface faces away from the open interior, yet when the flow of air drawn by the vacuum source through the aperture is reduced due to the aperture being at least partially blocked, the outer surface of the flexible portion faces the object being grasped.

Figure 1:
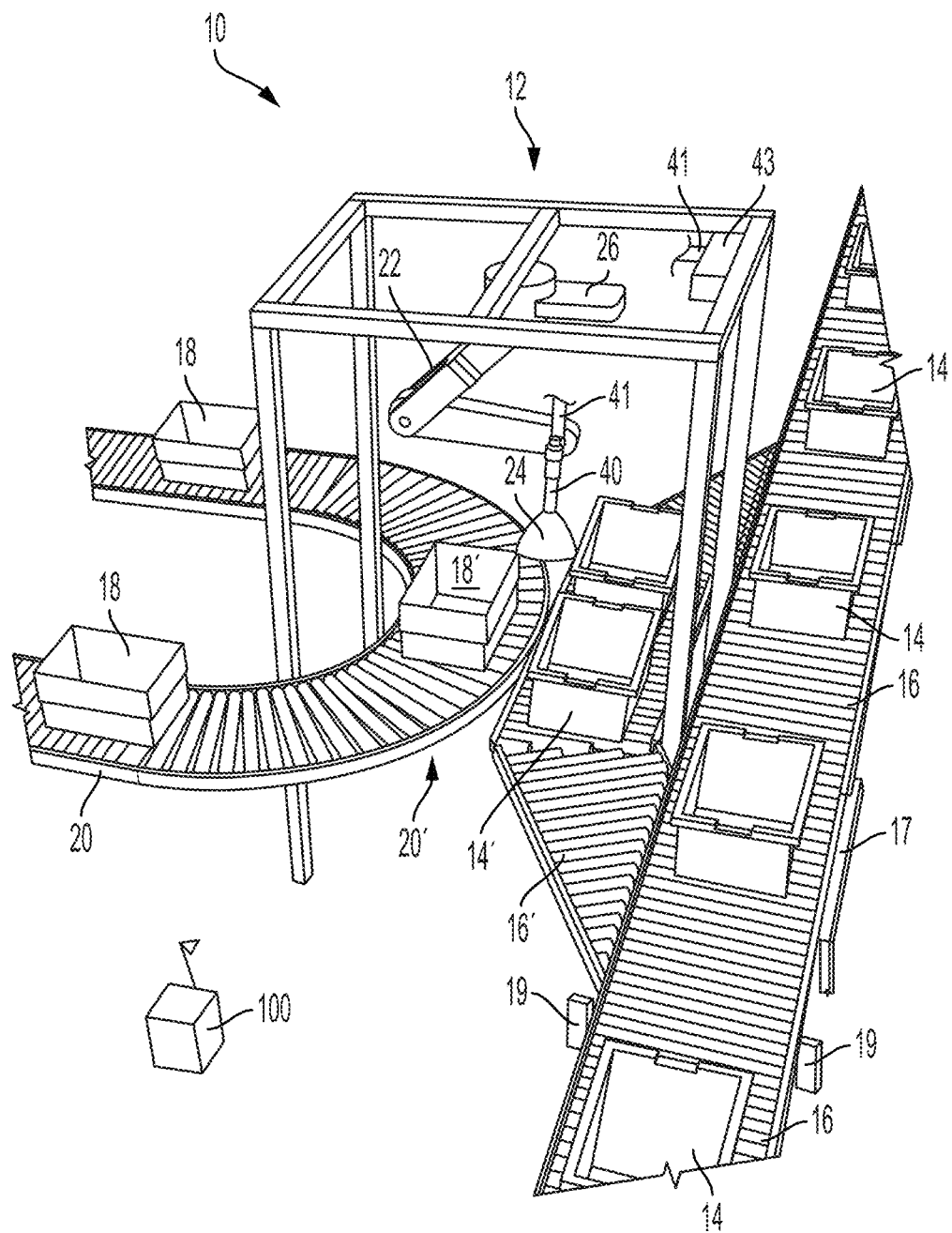
FIG. 1 shows and illustrative diagrammatic view of an object processing system including a programmable motion device with an end effector in accordance with as aspect of the present invention.

The end-effector may be used with a programmable motion device in an object processing system. FIG. 1 for example, shows an object processing system 10 that includes an object processing station 12 between an infeed conveyor 16 that carries infeed bins 14, and a destination conveyor 20 that carries destination containers 18. The object processing station 12 includes a programmable motion device (e.g., an articulated arm 22) with an attached end-effector 24 as well as an associated perception system 26. The perception system 26 is positioned to perceive objects (and/or associated indicia) in selected infeed bins 14' that are diverted (selected) by diverter 17 to move along selected infeed conveyor 16'. The perception system 26 is positioned as well to perceive destination containers 18' that are provided on a processing destination conveyor section 20' of the destination conveyor 20. Operation of the system is controlled by one or more computer processing systems 100 that communicate with the conveyors 16, 16' diverter 17, conveyor 20, programmable motion device 22 (including the end-effector 24) and perception system 26.

The object processing station 12 includes an infeed conveyor section 16' that circulates supply bins 14' from and back to the infeed conveyor 16 using the diverter 17. The end-effector 24 of the programmable motion device 22 is programmed to grasp an object from the a supply bin 14', and move the object to deliver it to a desired destination bin 18 on the destination conveyor load area 20' by placing or dropping the object into the destination container 18' at the destination conveyor load area 20'. The supply bin 14' may then be returned to the input conveyor 16 and, optionally, brought to a further processing station. At the processing station 12 therefore, one or more vendor supply bins 14 are routed to an input area, and the programmable motion device 22 is actuated to grasp an object from a bin 14', and to place the object into a selected destination container 18'. The processed vendor bins 14' are then returned to the common input stream on the conveyor 16, and the destination container 18' is moved further along the destination conveyor 20.

The system 10 may also include one or more perception units 19 located on or near the infeed conveyor 16 for identifying indicia on an exterior of each of the bins 14, providing perception data from which the contents of the bin may be identified, and then knowing its relative position on the conveyor 16, track its location. It is assumed, in accordance with an aspect, that the bins of objects are marked in one or more places on their exterior with a visually distinctive mark such as a barcode (e.g., providing a UPC code), QR code, or radio-frequency identification (RFID) tag or mailing label so that they may be sufficiently identified with a scanner for processing. The type of marking depends on the type of scanning system used, but may include 1D or 2D code symbologies. Multiple symbologies or labeling approaches may be employed. The types of scanners employed are assumed to be compatible with the marking approach. The marking, e.g. by barcode, RFID tag, mailing label or other means, encodes a identifying indicia (e.g., a symbol string), which is typically a string of letters and/or numbers. The symbol string uniquely associates the vendor bin with a specific set of homogenous objects. Based on the identified code on an infeed bin 14', the system may either permit a bin 14 to continue along the infeed conveyor 16, or using diverter 17, may direct the selected bin 14' onto the selected infeed conveyor 16'.

On the selected infeed conveyor 16' at the object processing station 12, the perception system 26 assists (using the central control system 100—e.g., one or more computer processing systems) the programmable motion device 22 including the end-effector 24 in locating and grasping an object in the infeed bin 14'. In accordance with further aspects, each object may also be marked with a visually distinctive mark, again such as a barcode (e.g., providing a UPC code), QR code, or radio-frequency identification (RFID) tag or mailing label so that they may be sufficiently identified with a scanner for processing. The type of marking depends on the type of scanning system used, but may include 1D or 2D code symbologies. Again, multiple symbologies or labeling approaches may be employed on each object.

Figure 2:
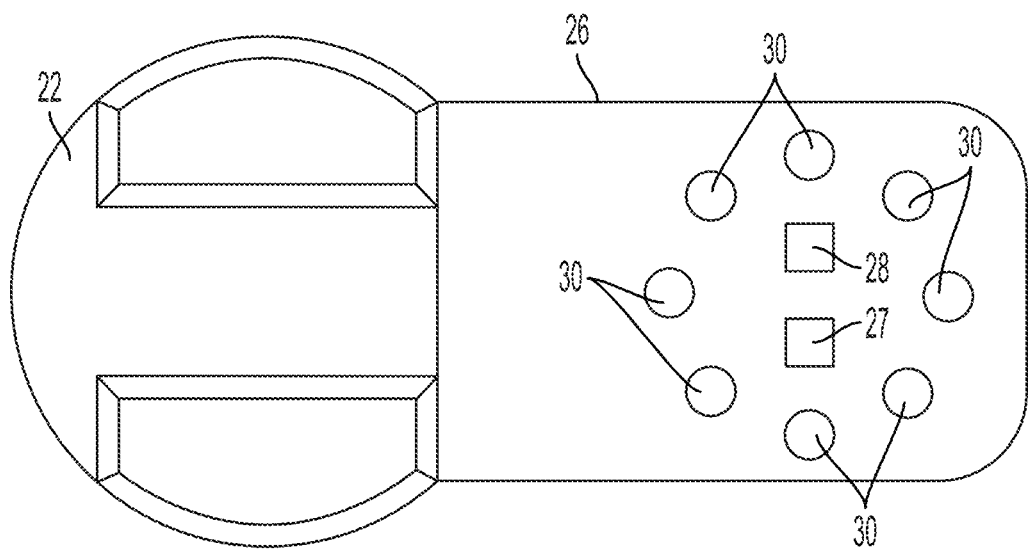
FIG. 2 shows an illustrative diagrammatic underside view of the perception system of FIG. 1.

With reference to FIG. 2, the perception system 26 that looks down in the object processing station 12 perceives perception data from one or more objects with the selected infeed bin 14' on the selected infeed conveyor 16'. The perception system 26 is mounted above a bin of objects to be processed next to the base of the articulated arm 22, looking down into a bin 32. The perception system 26, for example and as shown in FIG. 2, may include (on the underside thereof), a camera 27, a depth sensor 28 and lights 30. A combination of 2D and 3D (depth) data is acquired. The depth sensor 28 may provide depth information that may be used together with the camera image data to determine depth information regarding the various objects in view. The lights 30 may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

Figure 3:
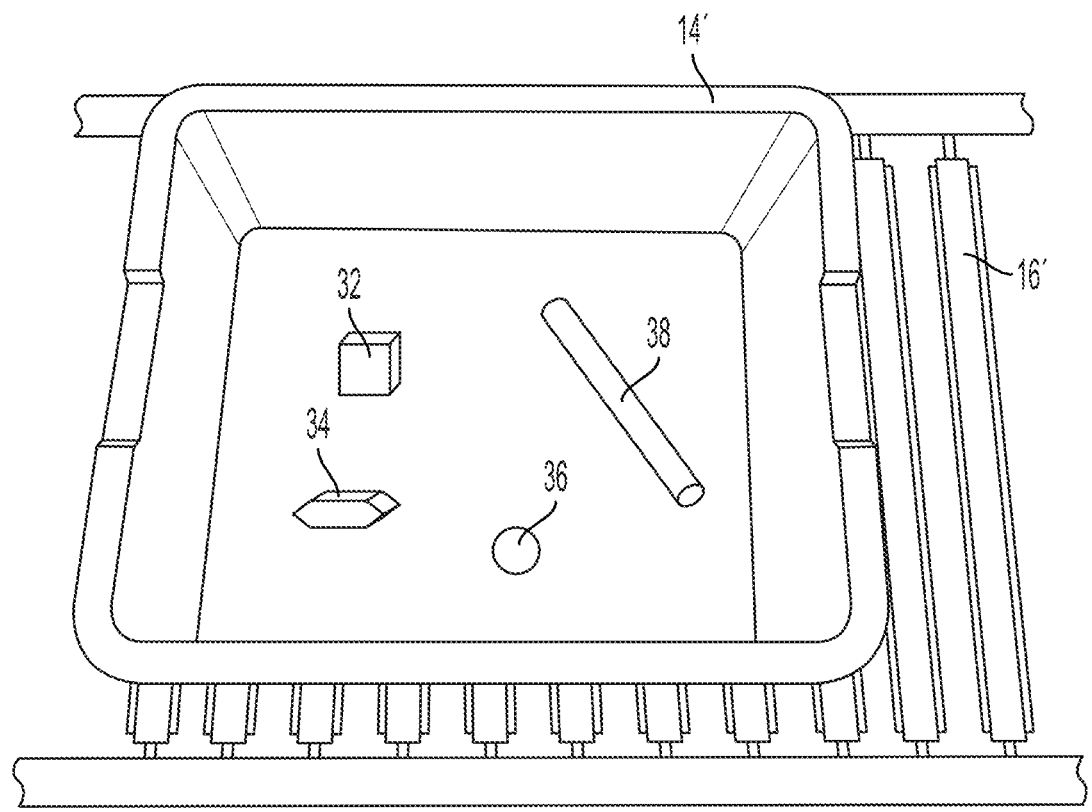
FIG. 3 shows an illustrative diagrammatic view of a bin of objects to be processed from the perception system of FIG. 1.

FIG. 3 shows a view of the bin 14' from the perception system 26. The image view shows the bin 14' (e.g., on the conveyor 16'), and the bin 14' contains objects 32, 34, 36 and 38. While in certain systems, the objects in each infeed bin may be homogenous, in other systems, such as shown in FIG. 3, the objects may be non-homogenous. The system will identify candidate grasp locations on one or more objects, and may not try to yet identify a grasp location for the object that is partially obscured by other objects. Candidate grasp locations may be indicated using a 3D model of the robot end effector placed in the location where the actual end effector would go to use as a grasp location. Grasp locations may be considered good, for example, if they are close to the center of mass of the object to provide greater stability during grasp and transport, and/or if they avoid places on an object such as caps, seams etc. where a good vacuum seal might not be available.

If an object cannot be fully perceived by the detection system, the perception system considers the object to be two different objects, and may propose more than one candidate grasps of such two different objects. If the system executes a grasp at either of these bad grasp locations, it will either fail to acquire the object due to a bad grasp point where a vacuum seal will not occur, or will acquire the object at a grasp location that is very far from the center of mass of the object and thereby induce a great deal of instability during any attempted transport. Each of these results is undesirable.

If a bad grasp location is experienced, the system may remember that location for the associated object. By identifying good and bad grasp locations, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

Again, the operations of the system described above are coordinated with a central control system 100 that again communicates (e.g., wirelessly) with the articulated arm 22, the perception units 19, 26, 28 and 30, as well as in-feed conveyors 16, 16', diverter 17 and destination conveyor 20. This system determines from symbol strings the UPC associated with a vendor bin, as well as the outbound destination for each object. The central control system 100 is comprised of one or more workstations or central processing units (CPUs). For example, the correspondence between UPCs or mailing labels, and outbound destinations is maintained by a central control system in a database called a manifest. The central control system maintains the manifest by communicating with a warehouse management system (WMS). The manifest provides the outbound destination for each inbound object.

Figure 4:
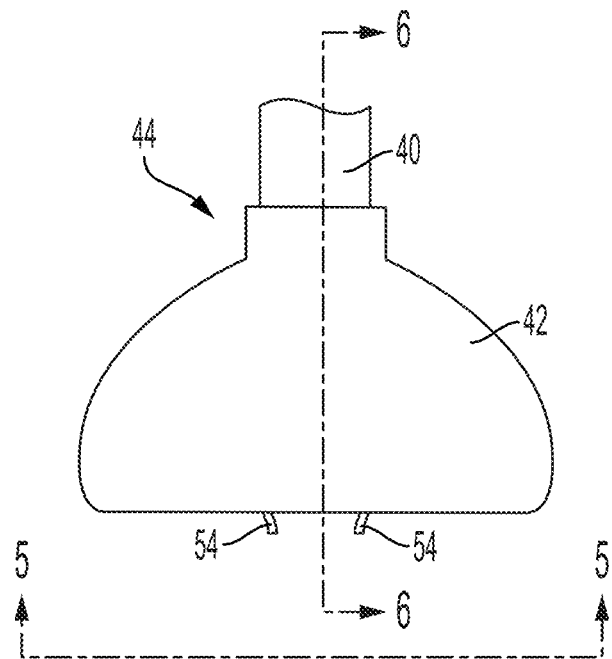
FIG. 4 shows an illustrative diagrammatic front view of the end effector of FIG. 1 in accordance with an aspect of the present invention.
Figure 5:
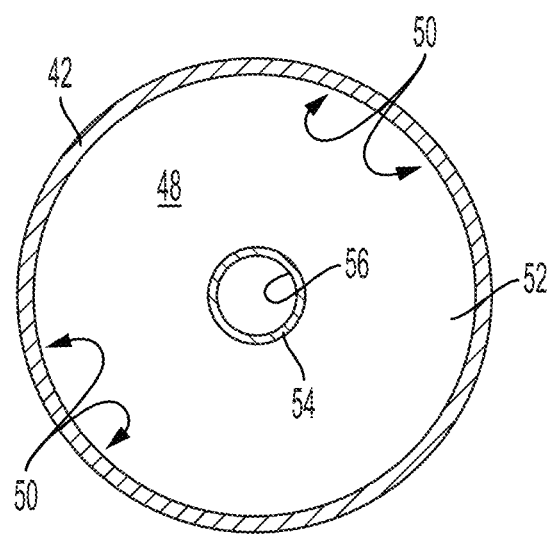
FIG. 5 shows an illustrative diagrammatic bottom view of the end effector of FIG. 4 taken along line 5-5 thereof.
Figure 6:
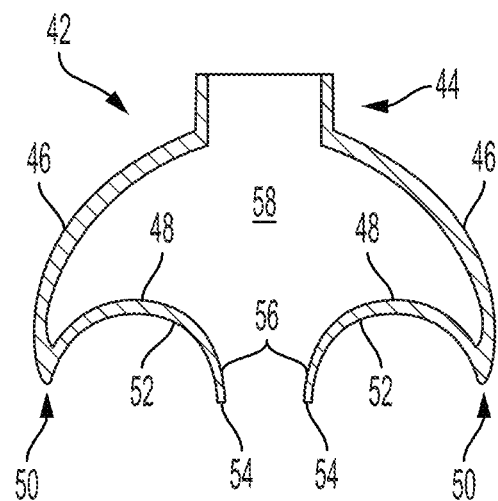
FIG. 6 shows an illustrative diagrammatic side sectional view of the end effector of FIG. 4 taken along line 6-6 thereof.

The end-effector 24 of FIG. 1 is shown in FIG. 4 coupled to the end-effector mounting section 40 of the programmable motion device 22. As shown in FIG. 4, the end-effector 24 includes a body 42 and a connection portion 44 for coupling to the end-effector mounting section 40. With further reference to FIGS. 5 and 6, the body 42 includes a proximal wall 46 that is coupled to the connection portion 44, and the proximal wall 46 is also coupled to a distal wall 48 via a flexible section 50. The distal wall 48 includes an outer facing portion 52, and ends in forming a contact surface 54 that defines an aperture 56. The interior of the body 42 (within the inside of the proximal wall 46 and the distal wall 48) provides an open interior 58.

The flexible portion 50 of the body 42 (e.g., a hinge portion) may be formed, in accordance with an aspect of the invention, of an elastomeric material, polymeric material, or even metallic material that in the desired shape has sufficient flexibility to permit the distal wall 48 to be drawn up into the interior body 42 due, at least in part, to a vacuum being applied within the interior body while an object is at least partially blocking the aperture 56 as discussed in more detail below. The proximal wall 46 and/or the distal wall 48 may also be formed of a material and shape that provides additional flexibility. Generally, a vacuum is provided from the aperture 56 through the opening in the connection portion 44 and the mounting section 40 through a hose 41 to a vacuum source 43 shown in FIG. 1.

In accordance with certain aspects, the vacuum source 43 may be switchable to change to a source of positive air pressure that is pushed from the vacuum source 43 to the aperture 56 to urge both an object away from the contact surface 54 and to push the distal wall 48 distally. In accordance with further aspects, in addition to being formed of flexible material, the flexible portion and/or the proximal wall and/or the distal wall may be formed of a material and shape that provides a desired spring constant. The desired spring constant may provide that the body 42 is biased to the shape shown in FIG. 4 such that when deformed (as discussed below with reference to FIGS. 8-10), the body 42 will act against any deformation, at least partially assisting in causing the body 42 to return to its original shape (again, shown in FIG. 4).

Figure 7:
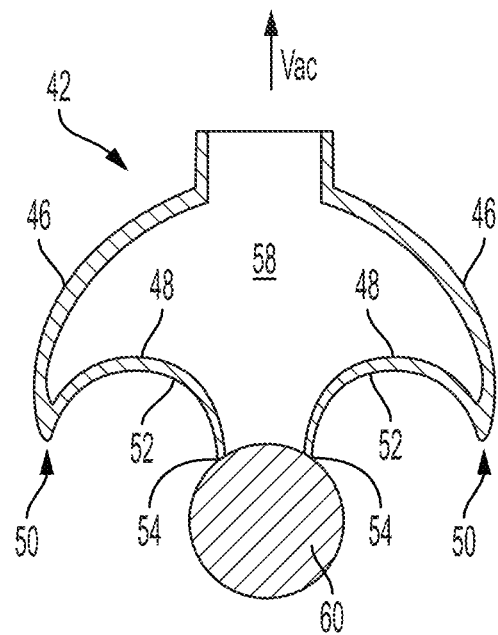
FIG. 7 shows an illustrative diagrammatic side sectional view of the end effector of FIG. 6 contacting an object.
Figure 8:
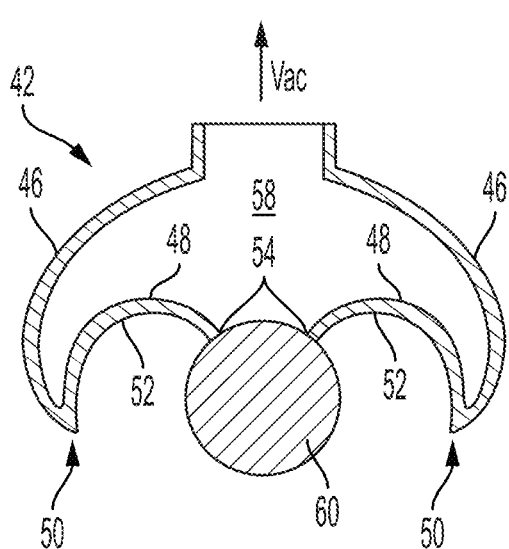
FIG. 8 shows an illustrative diagrammatic side sectional view of the end effector of FIG. 7 beginning to draw in the object.
Figure 9:
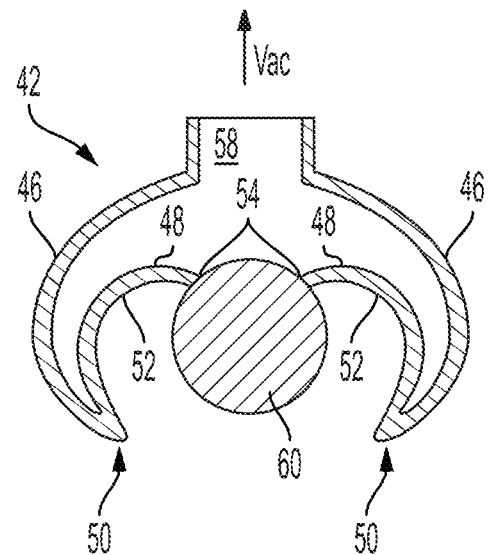
FIG. 9 shows an illustrative diagrammatic side sectional view of the end effector of FIG. 7 further drawing in the object.

With reference to FIG. 7, when the contact surface 54 of the distal wall 48 contacts an object 60, the object may partially or fully block the aperture 56 (shown in FIG. 6), causing the object 60 to be grasped by the end-effector due to the vacuum being applied through the aperture 56, the open interior 58, and the insides of the end-effector mounting section 40 and hose 41. A result of the aperture 56 being partially or fully blocked, is that the contact surface 54 (and the object) will be drawn into the open interior 58 due, in part, to the vacuum and due, in part, to the flexibility of the flexible portion 50, and optionally as well as the proximal wall 46 and/or the distal wall 48. FIG. 8 shows the contact surface 54 and the object 60 beginning to enter the open interior 58, FIG. 9 shows the contact surface 54 and the object 60 further entered in the open interior 58, and FIG. 10 shows the contact surface 54 and the object 60 fully entered into the open interior 58.

Figure 10:
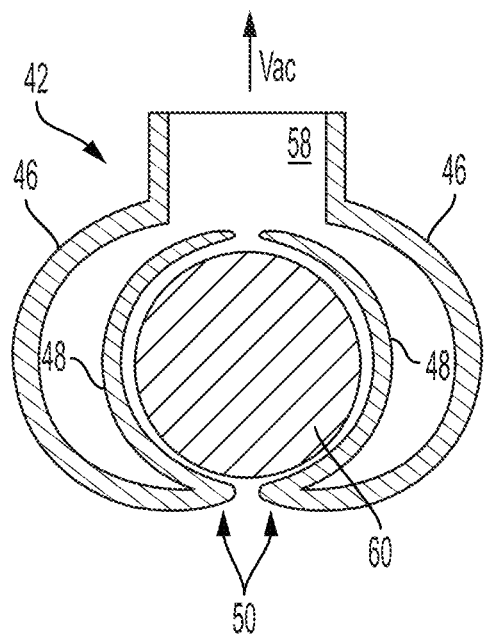
FIG. 10 shows an illustrative diagrammatic side sectional view of the end effector of FIG. 7 having fully drawn in the object.

Once engaged as shown in FIG. 10, the object 60 is both held by the vacuum as well as held by the outer surface 52 of the distal wall 48, as the outer surface 52 of the distal wall 48 now faces the object 60 and aids in containing the object 60 within the end-effector, with the flexible portion 50 having now come underneath at least a portion of the object 60.

The release of the object 60 from the end-effector may be accomplished by switching the vacuum to a positive pressure air source that urges the interior 58 to enlarge thereby urging the distal wall 48 radially outward, which causes the distal wall (and the contact surface 54) to move outward of the body 42, pushing the object 60 free of the end-effector 24. In accordance with another aspect, the release of the object 60 from the end-effector may be accomplished by switching the vacuum off, and permitting any of the flexible portion 50, the proximal wall 46 and/or the distal wall 48 that has sufficient spring constant to urge the distal wall 48 radially outward, which causes the distal wall (and the contact surface 54) to move outward of the body 42, pushing the object 60 free of the end-effector 24.

Figure 11:
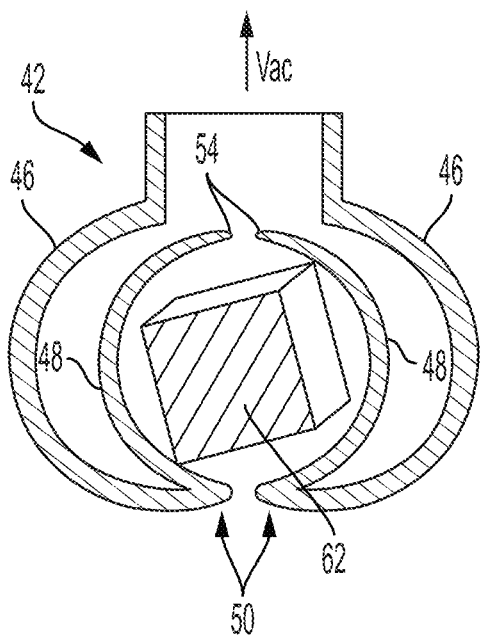
FIG. 11 shows an illustrative diagrammatic side sectional view of the end effector of FIG. 6 having fully drawn in a non-round object.
Figure 12:
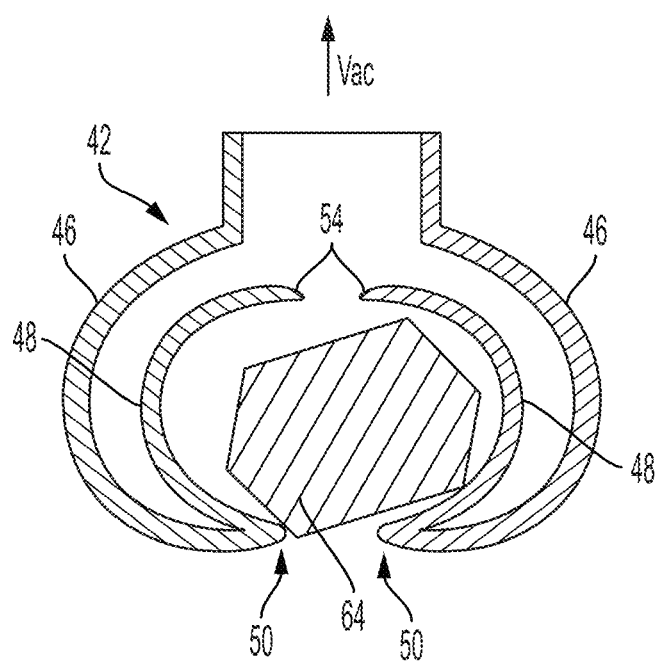
FIG. 12 shows an illustrative diagrammatic side sectional view of the end effector of FIG. 6 having drawn in a larger non-round object.

In accordance with further aspects, the shape and contours of the outer surface of the distal wall when fully engaged within the open interior, may not be required to match the shape and contour of the object being engaged. FIG. 11, for example, shows the end-effector 24 with the body 42 including a proximal wall 46 and a distal wall 48 holding an object 62 within the outer surface 52 of the distal wall 48 wherein the object 62 does not conform to the shape and contour of the outer surface 52 of the distal wall 48 in accordance with an aspect of the invention. FIG. 12 further shows the end-effector 24 with the body 42 including a proximal wall 46 and a distal wall 48 holding an object 62 within the outer surface 52 of the distal wall 48 wherein the object 64 not only does not conform to the shape and contour of the outer surface 52 of the distal wall 48, but further extends at least on part outside of the area defined between the outer surfaces 52 of the distal wall 48 (e.g., extends beyond the flexible portion 50).

Figure 13:
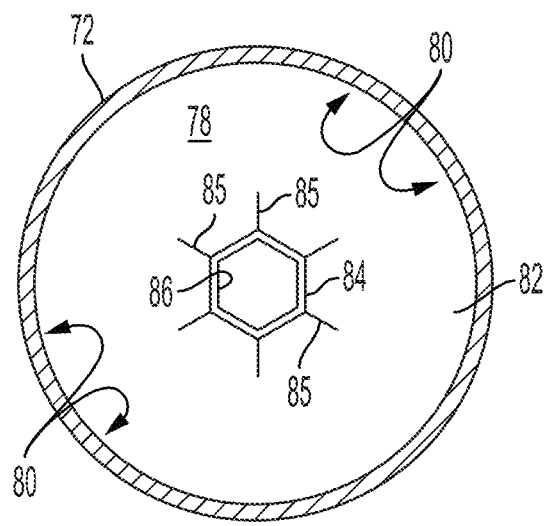
FIG. 13 shows an illustrative diagrammatic bottom view of an end-effector in accordance with another aspect of the invention that includes a polygonal aperture.

In accordance with further aspects, the contact surface of the distal wall may be other than circular, and may, for example, form a polygonal shape. FIG. 13, for example, shows a bottom view (similar to that shown in FIG. 5) of an end-effector is accordance with another aspect of the invention that includes an end-effector that includes a body 72 that includes a proximal wall that is coupled to the connection portion, and the proximal wall is also coupled to a distal wall 78 via a flexible section 80. The distal wall 78 includes an outer facing portion 82, and ends in forming a contact surface 84 that defines an aperture 86 that is in the shape generally of a polygon. The interior of the body 72 (within the inside of the proximal wall and the distal wall 78) provides an open interior into which an object may be drawn as discussed above with reference to FIGS. 8-10. Because the aperture 86 is not circular, portions of the outer surface of the distal wall that are proximate sharp directional changes (e.g., corners) of the polygon may form short creases 85 in the outer surface 82 of the distal wall 78.

Figure 14:
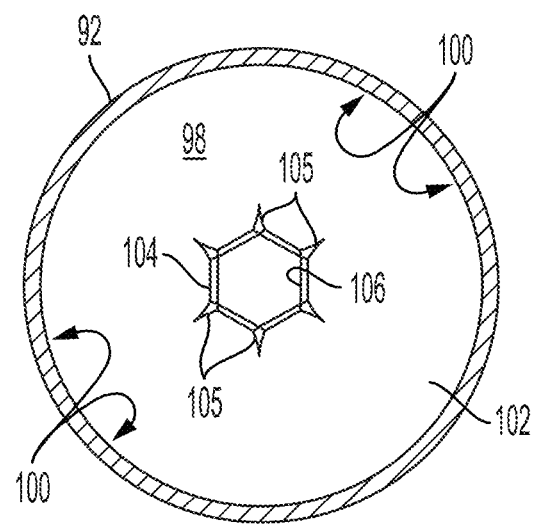
FIG. 14 shows an illustrative diagrammatic bottom view of an end-effector in accordance with another aspect of the invention that includes a polygonal aperture and relief openings.

In accordance with a further aspect, and in order to relieve any strain on such creases 85 of the end-effector of FIG. 13, the outer surface of the distal wall of an end-effector in accordance with a further aspect may include relief openings. For example, FIG. 14 shows a bottom view (similar to that shown in FIG. 5) of an end-effector is accordance with another aspect of the invention that includes an end-effector that includes a body 92 that includes a proximal wall that is coupled to the connection portion, and the proximal wall is also coupled to a distal wall 98 via a flexible section 100. The distal wall 98 includes an outer facing portion 102, and ends in forming a contact surface 104 that defines an aperture 106 that is in the shape generally of a polygon. The interior of the body 92 (within the inside of the proximal wall and the distal wall 98) provides an open interior into which an object may be drawn as discussed above with reference to FIGS. 8-10. Again, because the aperture 106 is not circular, portions of the outer surface of the distal wall that are proximate sharp directional changes (e.g., corners) of the polygon may provide stress on the outer surface, short relief openings 105 may be provided that relieve the stress on the distal wall 98. Again, any seal against an object is not required to be complete, and with sufficient air flow of the vacuum, the opening areas provided by the relief openings may be small enough to not adversely affect the grasp on the object. Further, as the object (and the contact surface) is drawn into the open interior, the relief openings 105 may become closed during the movement of the distal wall, increasing the vacuum force upon the object. In accordance with further aspects, the programmable motion device may assist in such grasping by urging the end-effector onto an object, thereby urging the distal walls inward, closing the relief openings 105 and increasing the vacuum applied to the object.

Figure 15:
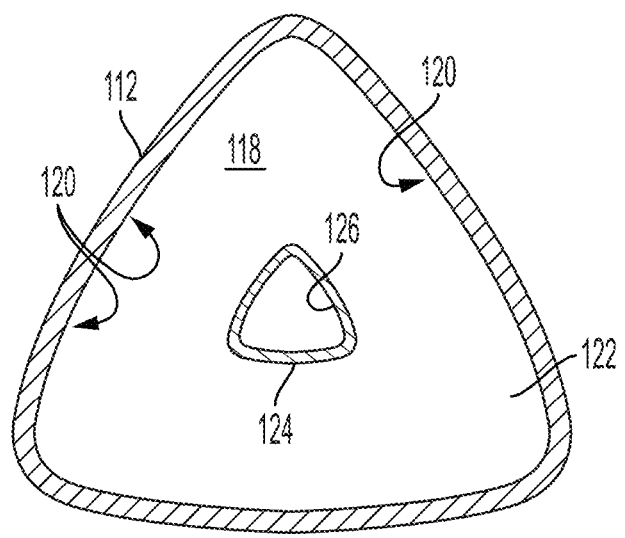
FIG. 15 shows an illustrative diagrammatic bottom view of an end-effector in accordance with another aspect of the invention that includes a generally triangular-shaped aperture.

In accordance with further aspects, the contact surface of the distal wall may form a polygonal, and in particular, a triangular shape, and further the outer shape of the body of the end-effector may also be non-circular. FIG. 15, for example, shows a bottom view (similar to that shown in FIG. 5) of an end-effector is accordance with another aspect of the invention that includes an end-effector that includes a body 112 that includes a proximal wall that is coupled to the connection portion, and the proximal wall is also coupled to a distal wall 118 via a flexible section 120. The distal wall 118 includes an outer facing portion 122, and ends in forming a contact surface 124 that defines an aperture 126 that is in the shape generally of a triangle. The interior of the body 112 (within the inside of the proximal wall and the distal wall 118) provides an open interior into which an object may be drawn as discussed above with reference to FIGS. 8-10. Although the aperture 126 is not circular, any directional changes (e.g., corners) of the triangle may rounded to relieve stress on the outer surface 122 of the distal wall 118.

Figure 16:
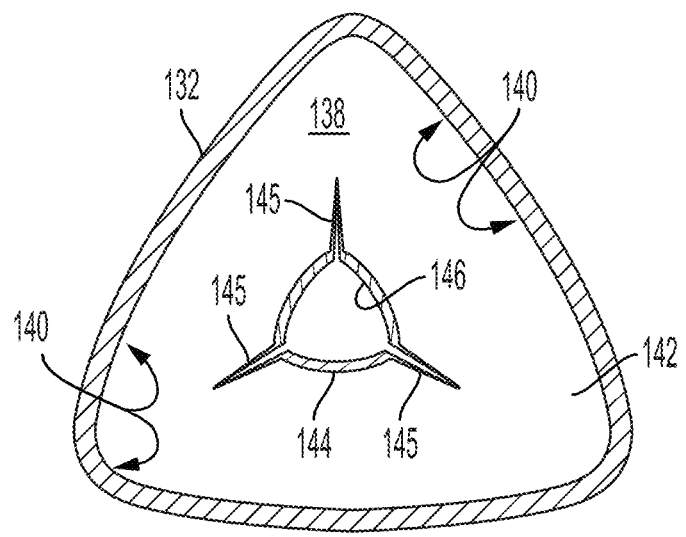
FIG. 16 shows an illustrative diagrammatic bottom view of an end-effector in accordance with another aspect of the invention that includes a generally triangular-shaped and relief openings.

In accordance with a further aspect, and in order to relieve any strain that in any event occurs at any such rounded corners of the contact surface 124 of the end-effector of FIG. 15, the outer surface of the distal wall of an end-effector in accordance with a further aspect may include relief openings. For example, FIG. 16 shows a bottom view (similar to that shown in FIG. 5) of an end-effector is accordance with another aspect of the invention that includes an end-effector that includes a body 132 that includes a proximal wall that is coupled to the connection portion, and the proximal wall is also coupled to a distal wall 138 via a flexible section 140. The distal wall 98 includes an outer facing portion 142, and ends in forming a contact surface 104 that defines an aperture 106 that is in the shape generally of a polygon. The interior of the body 132 (within the inside of the proximal wall and the distal wall 138) provides an open interior into which an object may be drawn as discussed above with reference to FIGS. 8-10. Again, because the aperture 146 is not circular, portions of the outer surface of the distal wall that are proximate even rounded directional changes (e.g., corners) of the triangle may provide stress on the outer surface, short relief openings 145 may be provided that relieve the stress on the distal wall 138. Again, any seal against an object is not required to be complete, and with sufficient air flow of the vacuum, the opening areas provided by the relief openings may be small enough to not adversely affect the grasp on the object. Further, as the object (and the contact surface) is drawn into the open interior, the relief openings 145 may become closed during the movement of the distal wall, increasing the vacuum force upon the object. In accordance with further aspects, the programmable motion device may assist in such grasping by urging the end-effector onto an object, thereby urging the distal walls inward, closing the relief openings 145 and increasing the vacuum applied to the object.

Figure 17:
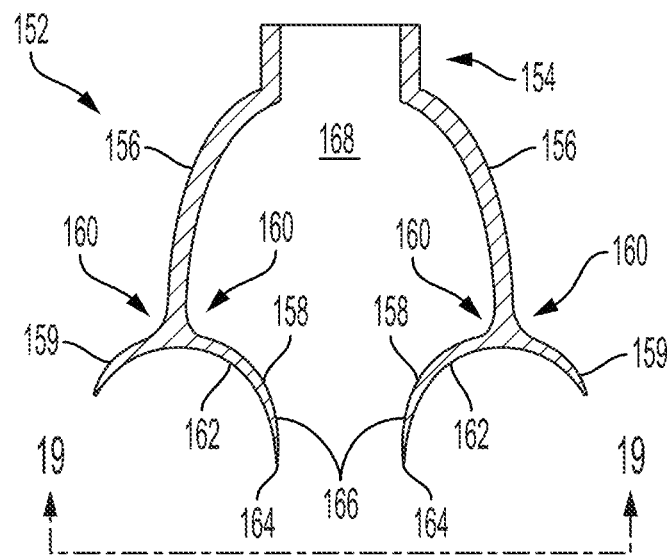
FIG. 17 shows an illustrative diagrammatic side sectional view of the end effector in accordance with another aspect of the invention that includes a flexible portion at an intermediate location along a distal wall.
Figure 18:
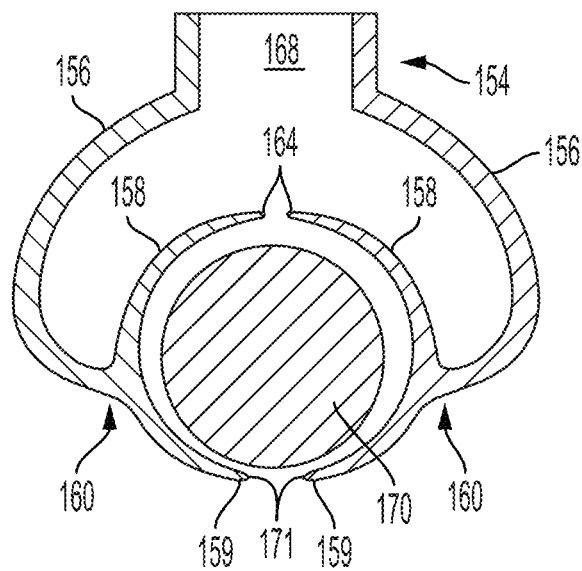
FIG. 18 shows an illustrative diagrammatic side sectional view of the end effector of FIG. 17 contacting an object.

With reference to FIGS. 17 and 18, in accordance with another aspect of the invention, an end-effector may be coupled to the end-effector mounting section of the programmable motion device as discussed above, and may further include a distal wall that includes a flexible portion that is attached not at an end thereof, but at portion intermediate the distal wall. In particular, FIG. 17 shows a body 152 and a connection portion 154 for coupling to the end-effector mounting section of a programmable motion device as discussed above. With further reference to FIG. 18, the body 152 includes a proximal wall 156 that is coupled to the connection portion 154, and the proximal wall 156 is also coupled to a distal wall 158 via a flexible section 160. The distal wall 158 includes an outer facing portion 162, and ends in forming a contact surface 164 that defines an aperture 166. The distal wall 158 further includes an outer rim portion 159. The interior of the body 152 (within the inside of the proximal wall and the distal wall 158) provides an open interior 168.

The flexible portion 160 of the body 152 may be formed, in accordance with an aspect of the invention, of an elastomeric material, polymeric material, or eve metallic material that in the desired shape has sufficient flexibility to permit the distal wall 158 to be drawn up into the open interior 168 of the body 152 due, at least in part, to a vacuum being applied within the interior body while an object is at least partially blocking the aperture 171 similar to the examples discussed above. The proximal wall 156 and/or the distal wall 158 may also be formed of a material and shape that provides additional flexibility. Generally, a vacuum is provided from the aperture 166 through the opening in the connection portion 154 and the mounting section 40 through a hose 41 to a vacuum source 43 shown in FIG. 1.

Again, in accordance with certain aspects, the vacuum source 43 may be switchable to change to a source of positive air pressure that is pushed from the vacuum source 43 to the aperture 166 to urge both an object away from the contact surface 164 and to push the distal wall 158 distally. In accordance with further aspects, in addition to being formed of flexible material, the flexible portion and/or the proximal wall and/or the distal wall may be formed of a material and shape that provides a desired spring constant. The desired spring constant may provide that the body 152 is biased to an original shape such that when deformed (as discussed below with reference to FIG. 18), the body 152 will act against any deformation, at least partially assisting in causing the body 152 to return to its original shape (shown in FIG. 17).

Figure 19:
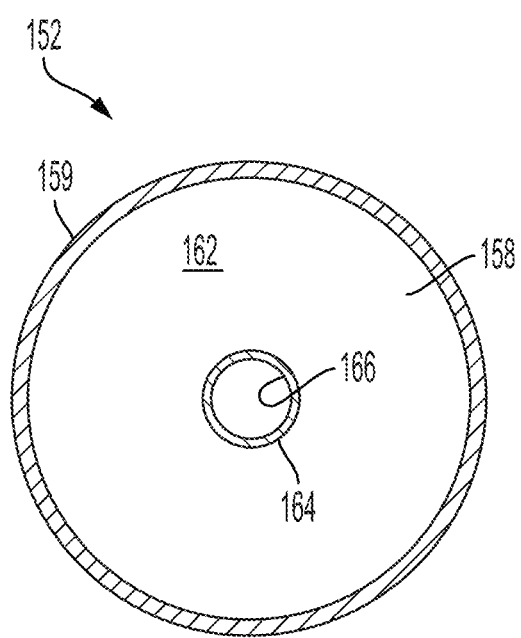
FIG. 19 shows an illustrative diagrammatic bottom view of the end effector of FIG. 17 taken along line 19-19 thereof.

With reference to FIG. 18, when the contact surface 164 of the distal wall 158 contacts an object 170, the object may partially or fully block the aperture 166 (shown in FIGS. 17 and 19), causing the object 170 to be grasped by the end-effector due to the vacuum being applied through the aperture 166, the open interior 168, and the insides of the end-effector mounting section and hose. A result of the aperture 166 being partially or fully blocked, is that the contact surface 164 (and the object 170) will be drawn into the open interior 168 due, in part, to the vacuum and due, in part, to the flexibility of the flexible portion 160, and optionally as well as the flexibility of the proximal wall 156 and/or the distal wall 158. FIG. 18 shows the contact surface 164 and the object 170 fully entered into the open interior 168. FIG. 19 shows an underside view of the end-effector body 152 of FIG. 17.

Once engaged as shown in FIG. 18, the object 170 is both held by the vacuum as well as held by the outer surface 162 of the distal wall 158 and the outer rim portion 159, as the outer surface 162 of the distal wall 158 and the outer rim portion 159 now faces the object 170 and aid in containing the object 170 within the end-effector, with the flexible portion 160 now facing the object 170 on all sides thereof, and the outer rim portion 159 now being at partially under the object 170.

The release of the object 170 from the end-effector may be accomplished by switching the vacuum to a positive pressure air source that urges the open interior 168 to enlarge thereby urging the distal wall 158 radially outward, which causes the distal wall (and the contact surface 164) to move outward of the body 152, pushing the object 170 free of the end-effector. In accordance with another aspect, the release of the object 170 from the end-effector may be accomplished by switching the vacuum off, and permitting any of the flexible portion 160, the proximal wall 156 and/or the distal wall 158 that has sufficient spring constant to urge the distal wall 158 radially outward, which causes the distal wall (and the contact surface 164) to move outward of the body 152, pushing the object 170 free of the end-effector.

Figure 20:
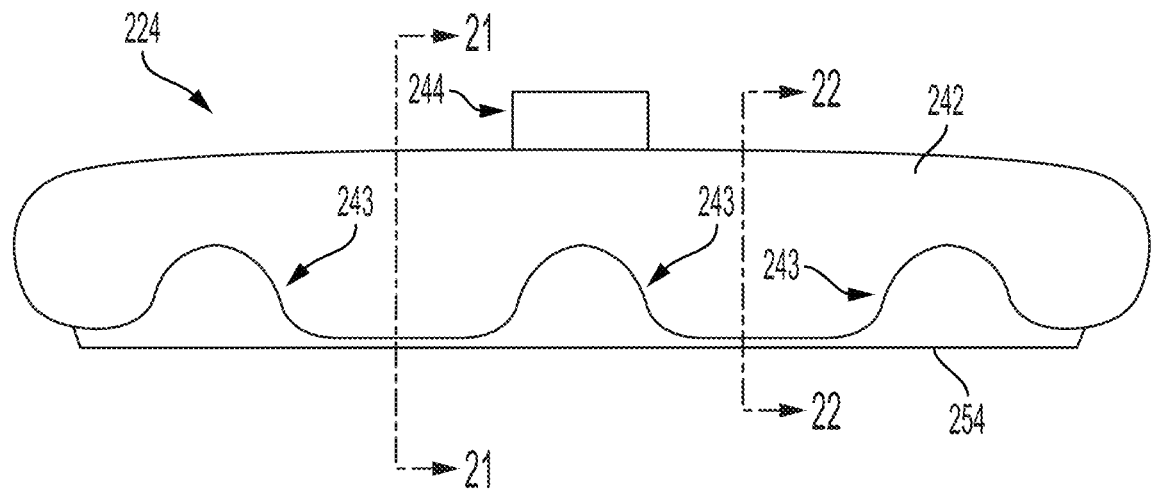
FIG. 20 shows an illustrative diagrammatic front view of an end-effector of a further aspect of the present invention that includes is elongated.
Figure 21:
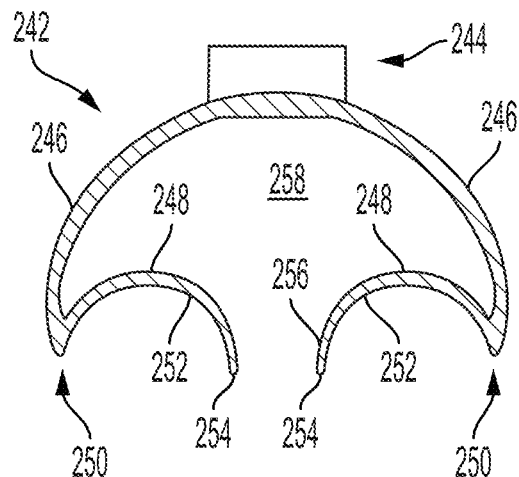
FIG. 21 shows an illustrative diagrammatic sectional view of the elongated end-effector of FIG. 20 taken along line 21-21 thereof.
Figure 22:
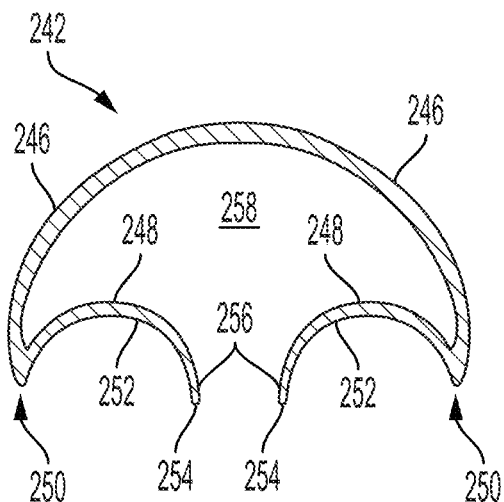
FIG. 22 shows an illustrative diagrammatic sectional view of the elongated end-effector of FIG. 20 taken along line 22-22 thereof.

In accordance with a further aspect, the body of the end effector may be elongated. FIG. 20 shows an end effector 224 with a body 242 that is elongated, and attaches to a mounting section (e.g., 40 shown in FIG. 1) at an attachment section 244 thereof. The body 242 may further include recessed portions 243 that may reduce any resistance to the body 242 bending as the body 242 folds in around an object as discussed further below. FIGS. 21 and 22 show sectional views of portions of the end effector 224 showing the attachment section 244 (in FIG. 21), and a proximal wall 246 that is coupled to the attachment section 244. The proximal wall 246 is also coupled to a distal wall 248 via a flexible section 250. The distal wall 248 includes an outer facing portion 252, and ends in forming a contact surface 254 that defines an aperture 256. The interior of the body 242 (within the inside of the proximal wall 246 and the distal wall 248) provides an open interior 258.

The flexible portion 250 of the body 242 may be formed, in accordance with an aspect of the invention, of an elastomeric material, polymeric material, or eve metallic material that in the desired shape has sufficient flexibility to permit the distal wall 48 to be drawn up into the interior body 242 due, at least in part, to a vacuum being applied within the interior body while an object is at least partially blocking the aperture 256 as discussed in more detail below. The proximal wall 46 and/or the distal wall 248 may also be formed of a material and shape that provides additional flexibility. Generally, a vacuum is provided from the aperture 256 through the opening in the attachment section 244 and the mounting section through a hose to a vacuum source as discussed above.

In accordance with certain aspects, the vacuum source may be switchable to change to a source of positive air pressure that is pushed from the source to the aperture 256 to urge both an object away from the contact surface 254 and to push the distal wall 48 distally. In accordance with further aspects, in addition to being formed of flexible material, the flexible portion and/or the proximal wall and/or the distal wall may be formed of a material and shape that provides a desired spring constant. The desired spring constant may provide that the body 242 is biased to the shape shown in FIG. 20 such that when deformed (as discussed below with reference to FIGS. 25-27), the body 242 will act against any deformation, at least partially assisting in causing the body 242 to return to its original shape (again, shown in FIG. 20).

Figure 23:
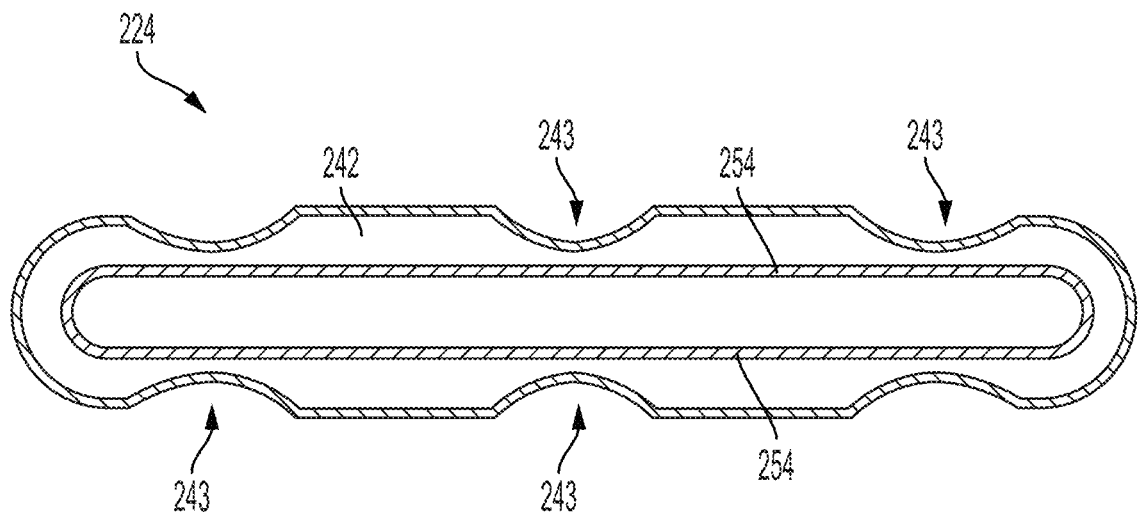
FIG. 23 shows an illustrative diagrammatic bottom view of the elongated end-effector of FIG. 20.
Figure 24:
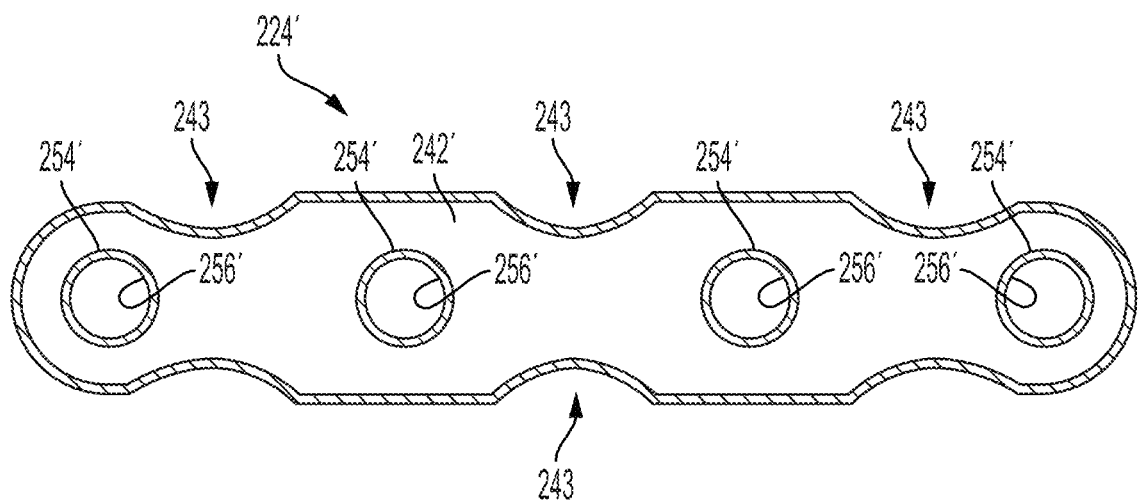
FIG. 24 shows an illustrative diagrammatic bottom view of an elongated end-effector in accordance with a further aspect of the invention in a view similar to that of FIG. 23.

With reference to FIG. 23, which shows an underside of the end effector 224 of FIG. 20, the contact surface 254 may define an elongated opening in accordance with certain aspects of the invention. The elongated opening may function to grasp the object via vacuum applied through the elongated opening, drawing the object and the contact surface 254 into the open interior. In accordance with further aspects, the contact surface 254' may be provided a as a plurality of distinct contact surfaces that define a plurality of linearly disposed apertures 256' as shown in FIG. 24. In particular, the plurality of linearly disposed apertures may function to grasp the object via vacuum applied through the apertures, drawing the object and the contact surface 254' into the open interior.

Figure 25:
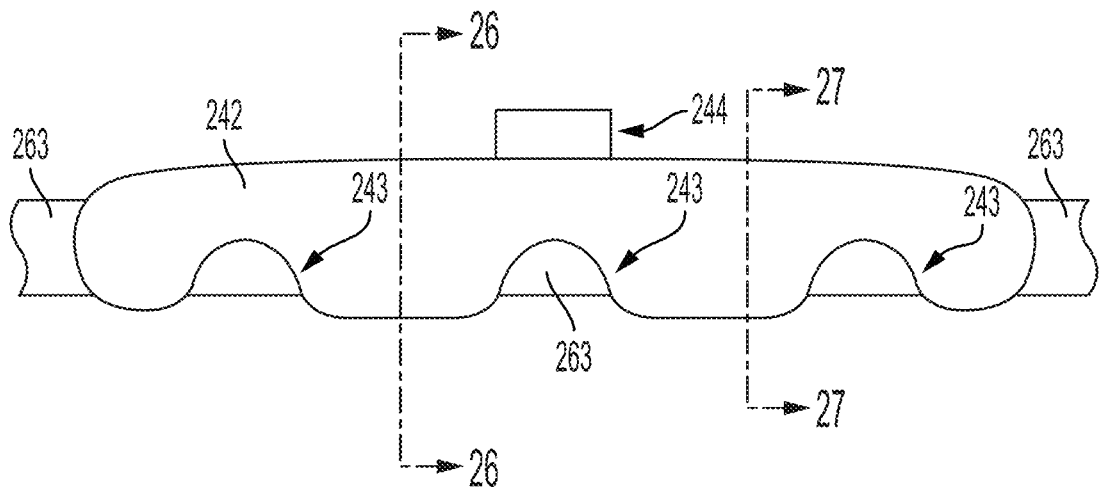
FIG. 25 shows an illustrative diagrammatic front view of the elongated end-effector of FIG. 20 while grasping an elongated object.

With reference to FIG. 25, when the contact surface 254 (or surfaces 254') of the distal wall 248 contacts an elongated object 263, the object may partially or fully block the aperture 256 (or apertures 256') as shown in FIG. 25, causing the object 263 to be grasped by the end-effector due to the vacuum being applied through the aperture 256 (or apertures 256'), the open interior 258, and the insides of the end-effector mounting section and hose. A result of the aperture 256 being partially or fully blocked, is that the contact surface 254 (or surfaces 254') and the object 263 will be drawn into the open interior 258 due, in part, to the vacuum and due, in part, to the flexibility of the flexible portion 250, and optionally as well as flexibility of the proximal wall 246 and/or the distal wall 248. FIG. 25 shows the contact surface 254 (or surfaces 254') and the object 263 fully entered into the open interior 258.

Figure 26:
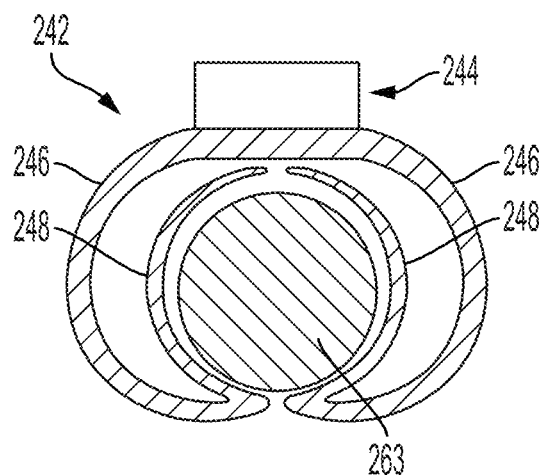
FIG. 26 shows an illustrative diagrammatic sectional view of the elongated end-effector of FIG. 25 taken along line 26-26 thereof.
Figure 27:
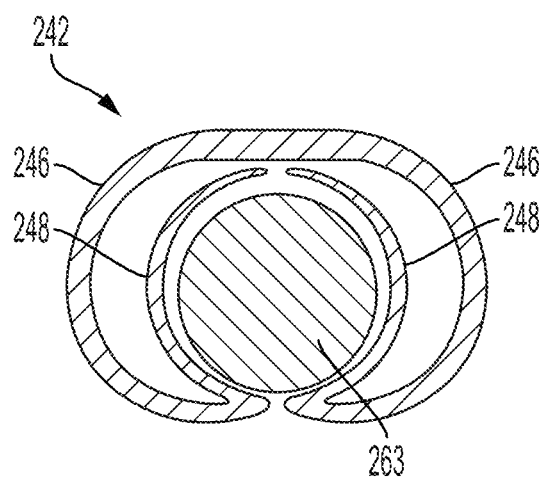
FIG. 27 shows an illustrative diagrammatic bottom view of the elongated end-effector of FIG. 25 taken along line 27-27 thereof.

FIGS. 26 and 27 show sectional views of the end-effector and object of FIG. 25. Once engaged as shown in FIGS. 25-27, the object 263 is both held by the vacuum as well as held by the outer surface 252 of the distal wall 248, as the outer surface 252 of the distal wall 248 now faces the object 263 and aids in containing the object 263 within the end-effector, with the flexible portion 250 having now come underneath at least a portion of the object 263.

The release of the object 263 from the end-effector may be accomplished by switching the vacuum to a positive pressure air source that urges the open interior 258 to enlarge thereby urging the distal wall 248 radially outward, which causes the distal wall (and the contact surface 254/254') to move outward of the body 242, pushing the object 263 free of the end-effector 224. In accordance with another aspect, the release of the object 263 from the end-effector may be accomplished by switching the vacuum off, and permitting any of the flexible portion 250, the proximal wall 246 and/or the distal wall 248 that has sufficient spring constant to urge the distal wall 248 radially outward, which causes the distal wall (and the contact surface 254/254') to move outward of the body 242, pushing the object 263 free of the end-effector 224.

Figure 28:
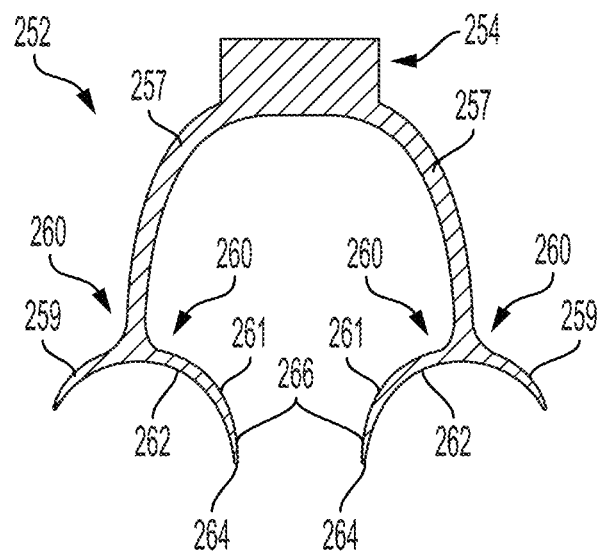
FIG. 28 shows an illustrative diagrammatic side sectional view of an elongated end effector in accordance with another aspect of the invention that includes a flexible portion at an intermediate location along a distal wall.
Figure 29:
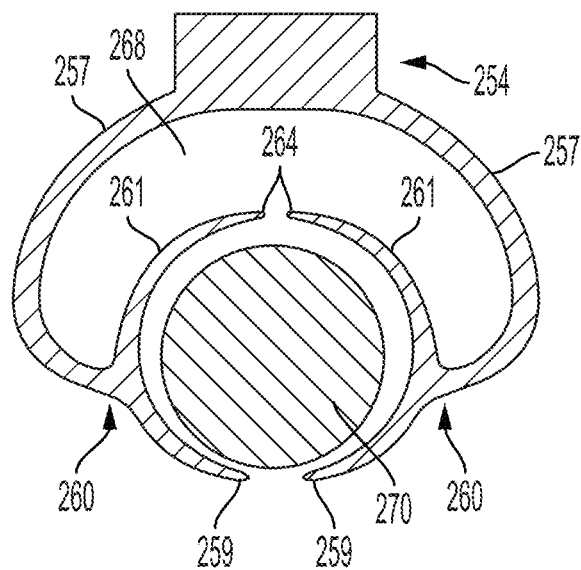
FIG. 29 shows an illustrative diagrammatic side sectional view of the end effector of FIG. 28 contacting an object.

With reference to FIGS. 28 and 29, in accordance with another aspect of the invention, an end-effector may be coupled to the end-effector mounting section of the programmable motion device as discussed above, and may further include a distal wall that includes a flexible portion that is attached not at an end thereof, but at portion intermediate the distal wall. In particular, FIG. 28 shows a body 252 and a connection portion 254 for coupling to the end-effector mounting section of a programmable motion device as discussed above. With further reference to FIG. 29, the body 252 includes a proximal wall 257 that is coupled to the connection portion 254, and the proximal wall 257 is also coupled to a distal wall 261 via a flexible section 260. The distal wall 261 includes an outer facing portion 262, and ends in forming a contact surface 264 that defines an aperture 266. The distal wall 261 further includes an outer rim portion 259. The interior of the body 252 (within the inside of the proximal wall and the distal wall 261) provides an open interior 268.

The flexible portion 260 of the body 252 may be formed, in accordance with an aspect of the invention, of an elastomeric material, polymeric material, or eve metallic material that in the desired shape has sufficient flexibility to permit the distal wall 261 to be drawn up into the interior 268 of the body 252 due, at least in part, to a vacuum being applied within the interior body while an object is at least partially blocking the aperture 266 similar to the examples discussed above. The proximal wall 257 and/or the distal wall 261 may also be formed of a material and shape that provides additional flexibility. Generally, a vacuum is provided from the aperture 266 through the opening in the connection portion 254 and the mounting section through a hose to a vacuum source as discussed above.

Again, in accordance with certain aspects, the vacuum source may be switchable to change to a source of positive air pressure that is pushed from the source to the aperture 266 to urge both an object away from the contact surface 264 and to push the distal wall 261 distally. In accordance with further aspects, in addition to being formed of flexible material, the flexible portion and/or the proximal wall and/or the distal wall may be formed of a material and shape that provides a desired spring constant. The desired spring constant may provide that the body 252 is biased to an original shape such that when deformed, the body 252 will act against any deformation, at least partially assisting in causing the body 252 to return to its original shape (shown in FIG. 28).

Again, when the contact surface 264 of the distal wall 261 contacts an object 270, the object may partially or fully block the aperture 266, causing the object 270 to be grasped by the end-effector due to the vacuum being applied through the aperture 266, the open interior 268, and the insides of the end-effector mounting section and hose. A result of the aperture 266 being partially or fully blocked, is that the contact surface 264 (and the object 270) will be drawn into the open interior 268 due, in part, to the vacuum and due, in part, to the flexibility of the flexible portion 260, and optionally as well as the flexibility of the proximal wall 257 and/or the distal wall 261.

Once engaged as shown in FIG. 29, the object 270 is both held by the vacuum as well as held by the outer surface 262 of the distal wall 261 and the outer rim portion 259, as the outer surface 262 of the distal wall 261 and the outer rim portion 259 now faces the object 270 and aid in containing the object 270 within the end-effector, with the flexible portion 260 now facing the object 270 on all sides thereof, and the outer rim portion 259 now being at partially under the object 270.

The release of the object 270 from the end-effector may be accomplished by switching the vacuum to a positive pressure air source that urges the open interior 168 to enlarge thereby urging the distal wall 261 radially outward, which causes the distal wall (and the contact surface 264) to move outward of the body 252, pushing the object 270 free of the end-effector. In accordance with another aspect, the release of the object 270 from the end-effector may be accomplished by switching the vacuum off, and permitting any of the flexible portion 260, the proximal wall 257 and/or the distal wall 261 that has sufficient spring constant to urge the distal wall 261 radially outward, which causes the distal wall (and the contact surface 264) to move outward of the body 252, pushing the object 270 free of the end-effector.

Figure 30:
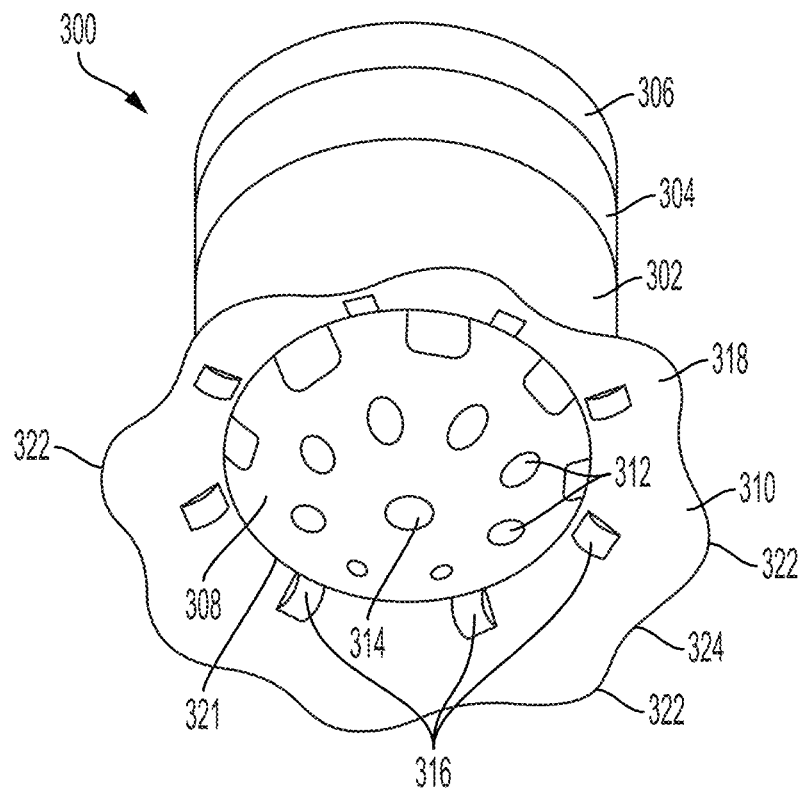
FIG. 30 shows an illustrative diagrammatic isometric view of an end effector in accordance with a further aspect of the present invention that includes a collapsible dome and a shroud.

With reference to FIG. 30, an end-effector 300 in accordance with another aspect of the invention includes a flexible body portion 302 attached to an end-effector base 304 that is coupled to a coupling 306 for mounting to a programmable motion device (such as programmable motion device of FIG. 1). The body 302 includes a collapsible dome 308 as well as a shroud 310. The collapsible dome 308 includes a plurality of apertures 312 as well as a central aperture 314. The flexible body 302 further includes a plurality of braces 316 mounted on an inner surface 318 of the shroud 310 proximate a generally circular base 321 of the collapsible dome 308.

Figure 31:
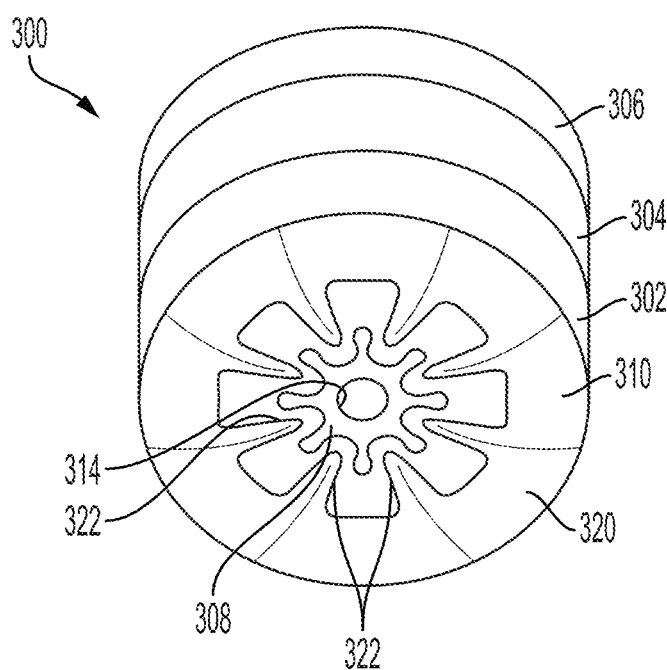
FIG. 31 shows an illustrative diagrammatic view of the end effector of FIG. 30 while grasping.
Figure 32:
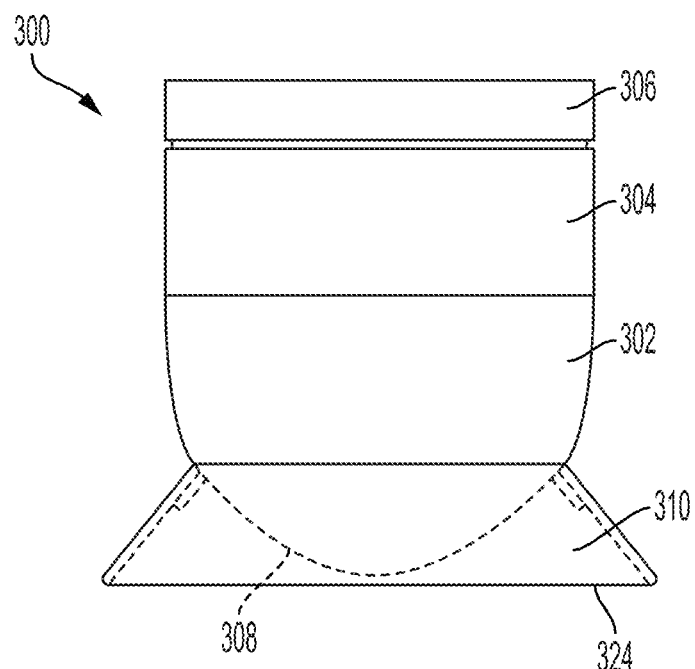
FIG. 32 shows an illustrative diagrammatic side view of the end effector of FIG. 30.
Figure 34:
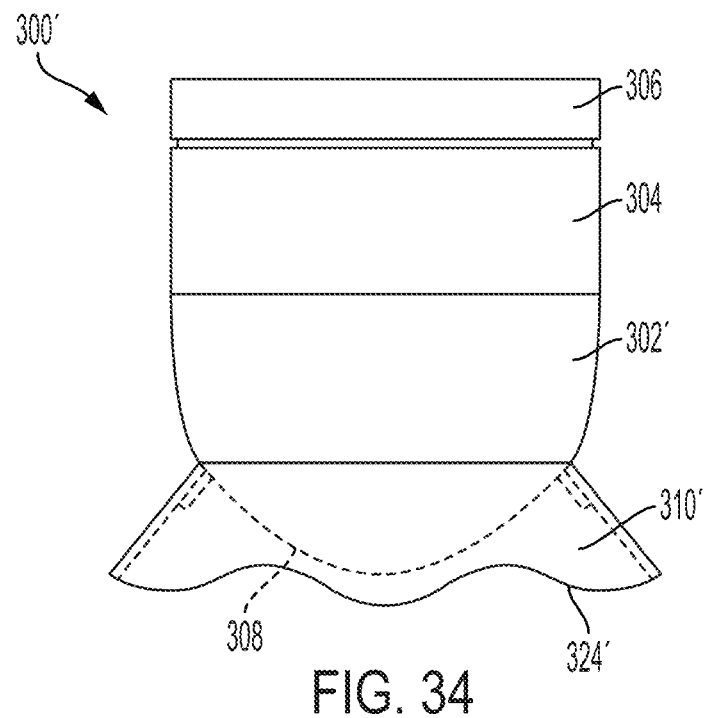
FIG. 34 shows an illustrative diagrammatic side view of an end effector in accordance with a further aspect of the present invention that includes a collapsible dome and a shroud with a scalloped edge.

The shroud 310 may be generally frustoconical in shape, and the outer edge 324 of the shroud 310 may include alternating extension regions 322 (e.g., may for example, be scalloped shaped). In accordance with an aspect, the outer edge 324 of the shroud 310 may be planar (e.g., flat) as shown in FIG. 32, or may be generally planar as shown in FIG. 34. With reference to FIG. 31, when a vacuum drawn through any of the plurality of apertures 312, 314 in the collapsible dome 308, the contact surface of the flexible body (e.g., the collapsible dome 308 and optionally at least a portion the shroud 310) may become drawn into an open interior of the end-effector. FIG. 31 shows the collapsible dome 308 and portions of the shroud 310 drawn within the end-effector, showing the outside 320 of the shroud 310 with the alternating extension regions 322 drawn centrally to aid in grasping an object.

Figure 33:
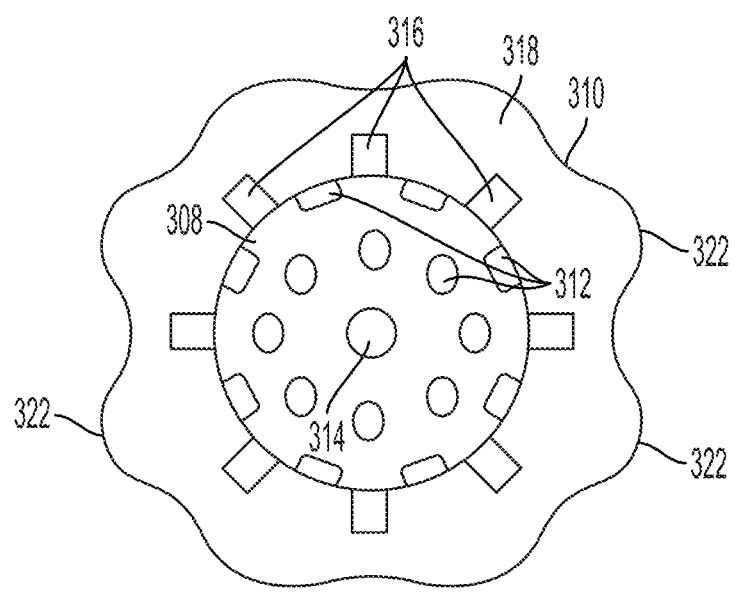
FIG. 33 shows an illustrative diagrammatic bottom view of the end effector of FIG. 30.

FIG. 32 shows a side view of the end-effector 300 of FIG. 30, showing the collapsible dome 308 in dashed lines within the shroud 310, and FIG. 33 shows the underside of the end-effector 300 showing the apertures 312, 314 as well as the braces 316 on the inner surface 318 of the shroud 310. FIG. 34 shows an end-effector 300' that includes an end-effector base 304 that is coupled to a coupling 306 for mounting to a programmable motion device, as well as a flexible body 302'. The flexible body 302' includes a shroud 310' that has an outer edge 324' that is not planar but that become planar when engaging a planar object (when the alternating extension regions 322' flatten on an object while engaging the object). Conversely, in the end-effector of FIGS. 30-33, the outer edge 324 of the shroud 310 forms a planar surface including the alternating extension regions 322. The areas between the alternating extension regions 322 may provide a plurality of features that permit flexing and/or bending to facilitate grasping an object.

Figure 35:
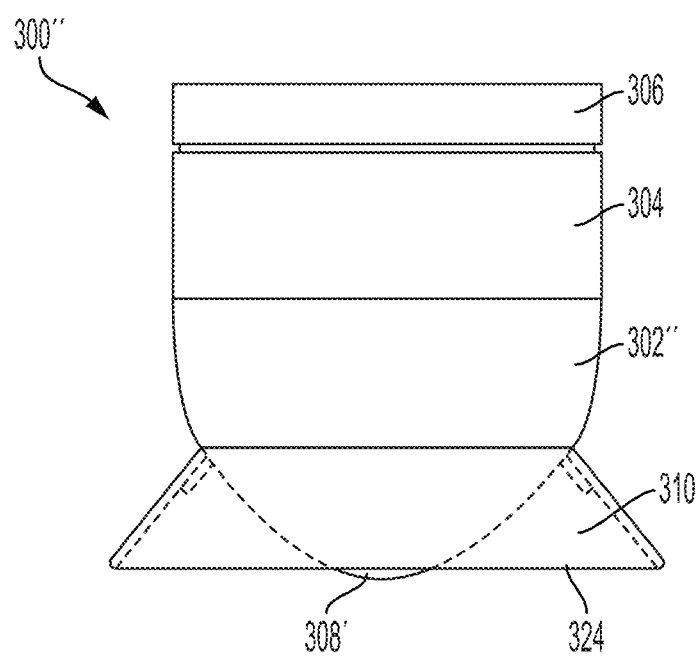
FIG. 35 shows an illustrative diagrammatic side view of an end effector in accordance with a further aspect of the present invention that includes a shroud and a collapsible dome that extends beyond the shroud prior to grasping.

FIG. 35 shows an end-effector 300" that includes an end-effector base 304 that is coupled to a coupling 306 for mounting to a programmable motion device, as well as a flexible body 302" that includes a collapsible dome 308' that extends beyond the outer edge 324 of the shroud 310. In each of the end-effectors of FIGS. 30-35 the collapsible dome may form part of the contact surface of the flexible body, and in the end-effector of FIG. 35, the collapsible dome may provide the contact surface that initially contacts an object.

Figure 36:
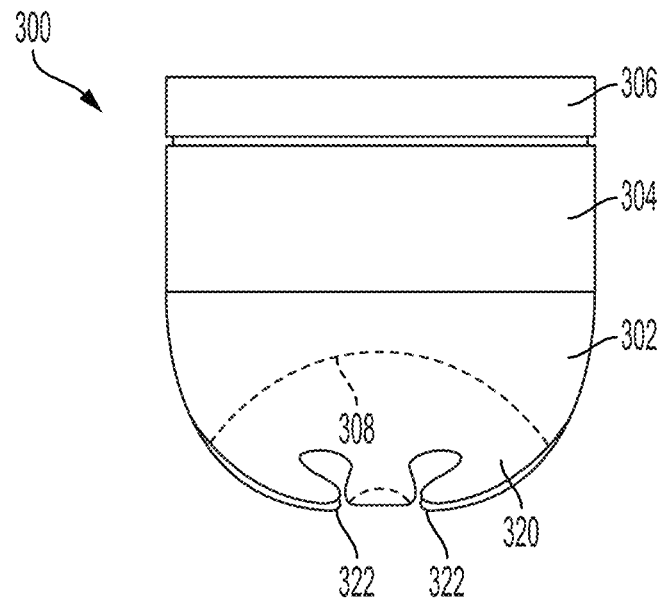
FIG. 36 shows an illustrative diagrammatic side view of the end effector of FIG. 30 while grasping.
Figure 37:
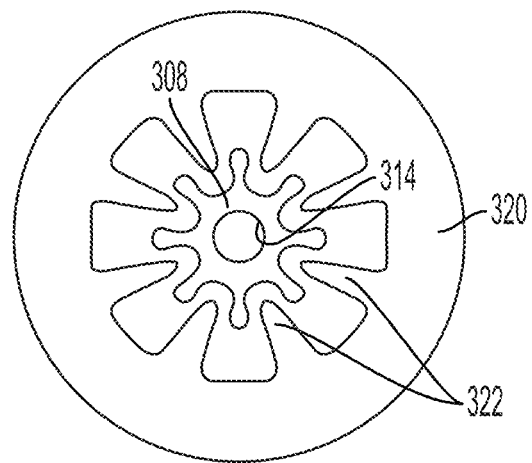
FIG. 37 shows an illustrative diagrammatic bottom view of the end effector of FIG. 36.
Figure 38:
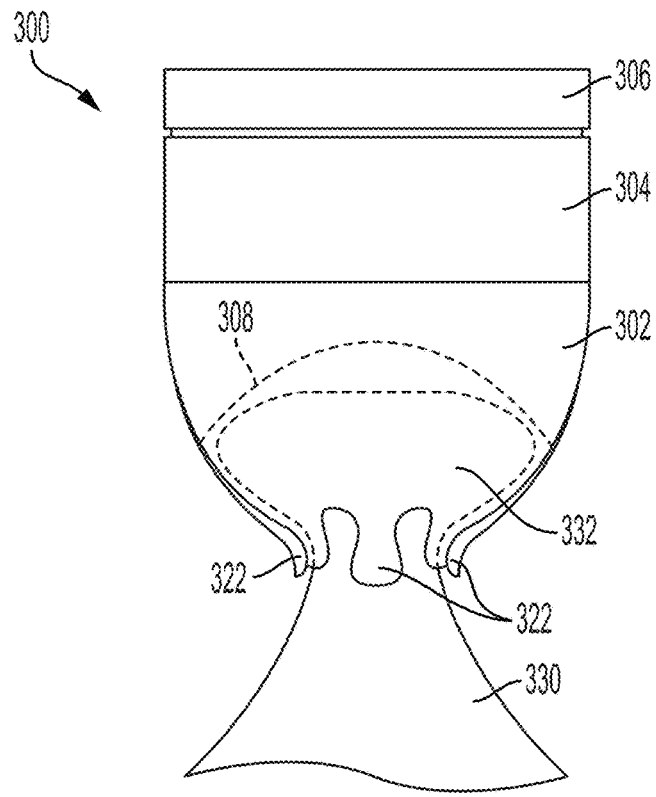
FIG. 38 shows an illustrative diagrammatic side view of the end effector of FIG. 30 while grasping a deformable object.

FIGS. 36 and 37 shows the flexible body 302 with the collapsible dome 308 in the collapsed position, with the alternating extension regions 322 centrally directed to engage an object. Again, the flexible body changes to the position of FIG. 36 (side view) and FIG. 37) bottom view when a vacuum through the flexible body 302 is occluded by an object. FIG. 38 shows the end-effector 300 having engaged a non-rigid object 330 (e.g., an object having low pose authority such as a plastic bag that contains items). A portion 332 of the bag 330 is drawn into the flexible body 302 together with collapsible dome 308. The shroud 310 is drawn in centrally, and the inner surface of the shroud 310 acts to contain at least a portion of the non-rigid object 330. Additionally, the inner surface of the shroud 310 provides a surface along which the portion 332 of the non-rigid object 330 must slide if the object were to slip out of the end-effector. This engagement with the object that additionally retains the object through shear forces provided by the angled contact portion in resisting any sliding downward of the bag with respect to the contact portion.

Figure 39:
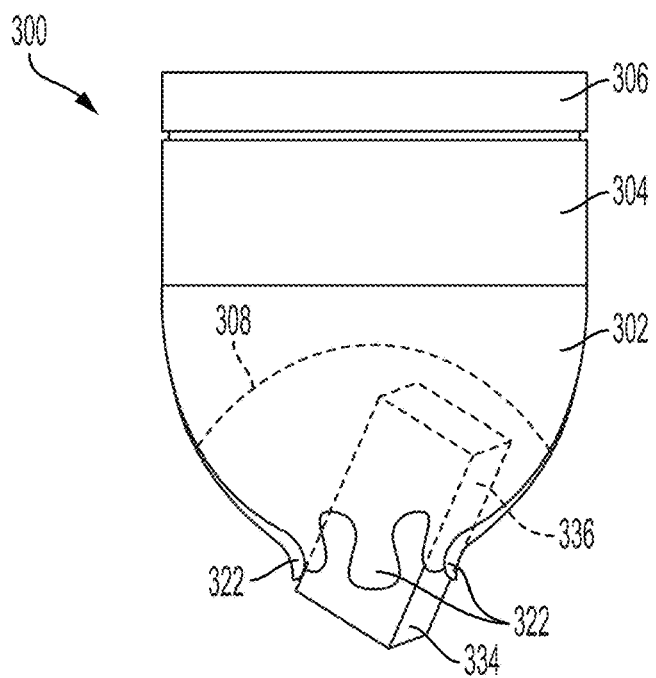
FIG. 39 shows an illustrative diagrammatic side view of the end effector of FIG. 30 while grasping a rigid object.

Similarly, FIG. 39 shows the end-effector 300 having engaged a longer object 334 (e.g., an object having high pose authority such as a rectangular box). A portion 336 of the box 334 is drawn into the flexible body 302 together with collapsible dome 308. The shroud 310 is drawn in centrally, and the inner surface of the shroud 310 acts to contain at least a portion of the object 334. Additionally, the inner surface of the shroud 310 provides a surface along which the portion 336 of the object 334 must slide if the object were to slip out of the end-effector. Again, this engagement with the object that additionally retains the object through shear forces provided by the angled contact portion in resisting any sliding downward of the bag with respect to the contact portion. The object (330, 334) may be released by any of removing the vacuum or providing positive air pressure.

Figure 40:
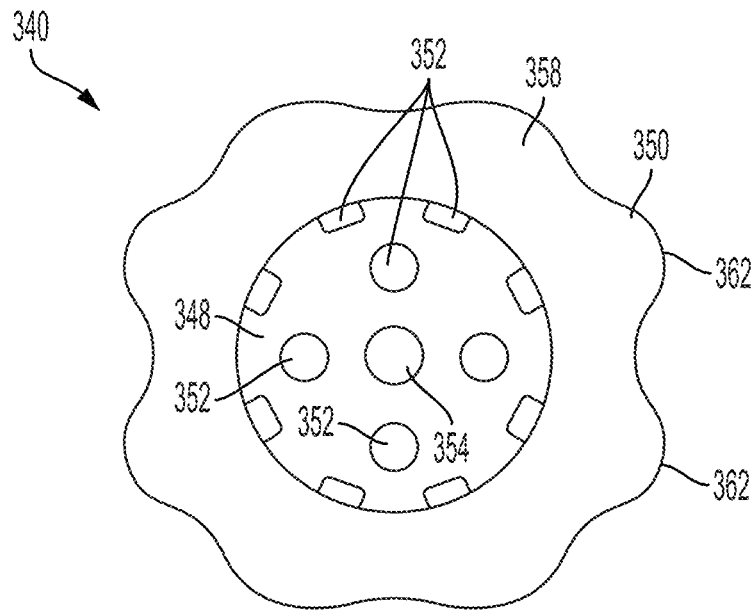
FIG. 40 shows an illustrative diagrammatic side view of an end effector in accordance with a further aspect of the present invention that includes a collapsible dome with fewer apertures, a shroud, and extension regions.
Figure 41:
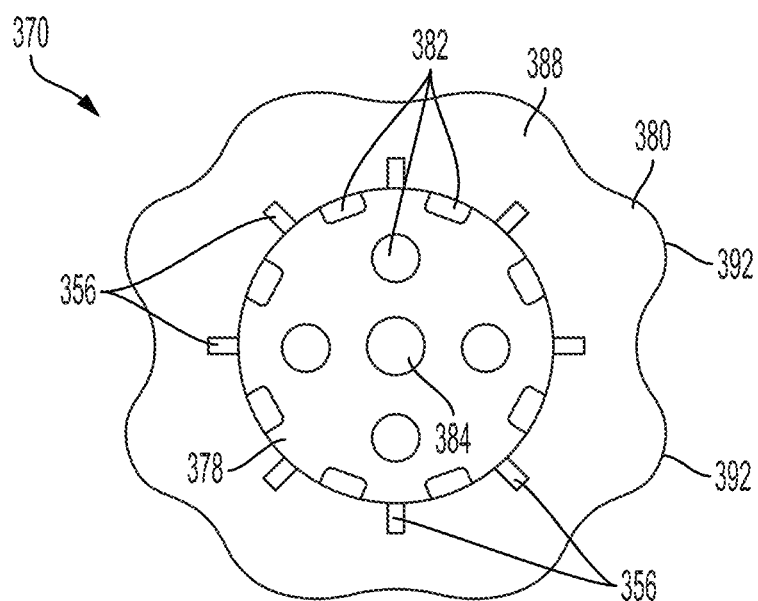
FIG. 41 shows an illustrative diagrammatic side view of an end effector in accordance with a further aspect of the present invention that includes a collapsible dome with fewer apertures, a shroud, extension regions, and additional braces.

With reference to FIG. 40 and in accordance with further aspects of the invention, an end-effector 340 may include a collapsible dome 348 having fewer apertures 352, 354 (the central aperture) and a shroud 350 with inner 358 and outer surfaces as well as extension regions 362 as discussed above. With reference to FIG. 41 and in accordance with further aspects of the invention, an end-effector 370 may include a collapsible dome 378 having fewer apertures 382, 384 (the central aperture) and a shroud 380. The shroud 380 may include inner 388 and outer surfaces as well as extension regions 392 as discussed above, with additional braces 356 that are smaller than the braces of the end-effector of FIGS. 30 and 37. In accordance with various aspects, the braces (316, 356) may facilitate the providing of vacuum force to more of the outer surfaces of the object when being held.

Figure 42:
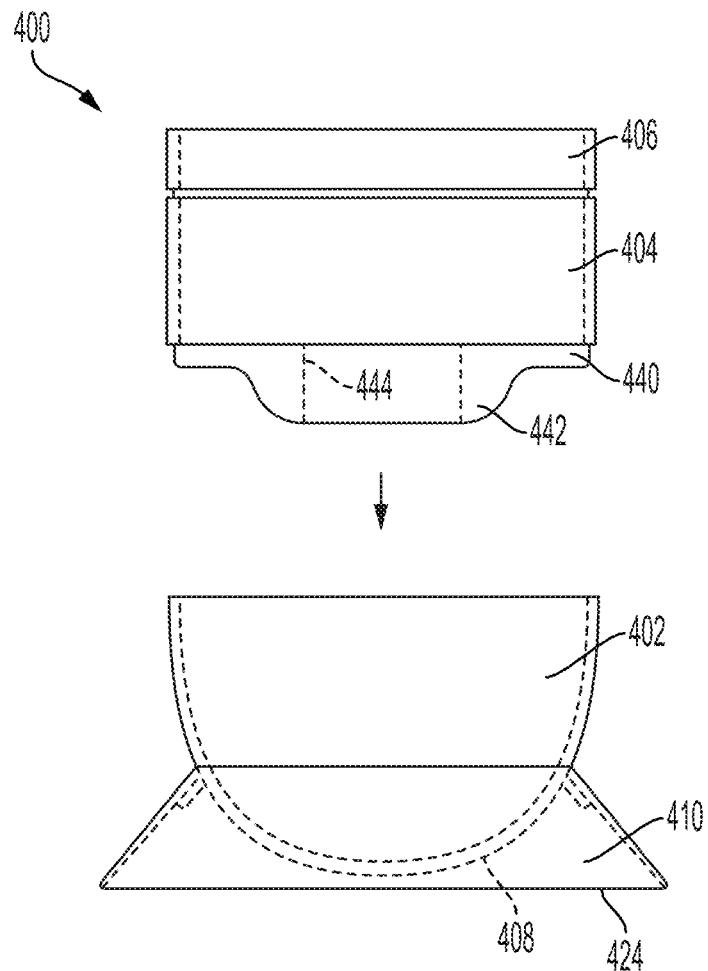
FIG. 42 shows an illustrative diagrammatic side view of an end effector in accordance with a further aspect of the present invention that includes a coupling attached to a flexible body.
Figure 43:
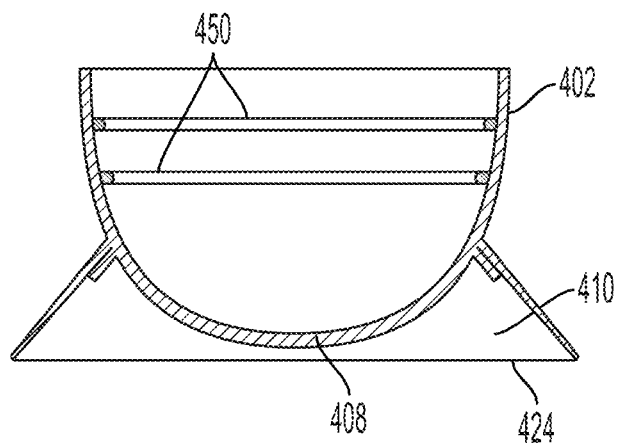
FIG. 43 shows an illustrative diagrammatic sectional side view of flexible body of FIG. 42 with inner circumferential support ribs.
Figure 44:
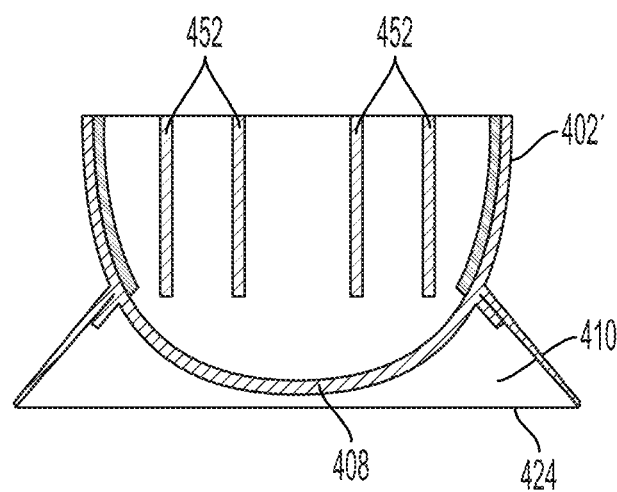
FIG. 44 shows an illustrative diagrammatic sectional side view of flexible body of FIG. 42 with axially extending support ribs.

In accordance with further aspects and with reference to FIG. 42, an end-effector 400 may include an end-effector base 404 that is coupled to a coupling 406 for mounting to a programmable motion device, as well as a flexible body 402. The flexible body 402 includes a shroud 410 with an outer edge 424, and with reference to FIG. 43, the inner surface of the flexible body may include one or more radially directed support ribs 450 that provide rigidity to inhibit excessive collapse of the flexible body 402. With reference to FIG. 44, the inner surface of the flexible body 402' may include one or more longitudinally directed support ribs 452 that provide rigidity to inhibit excessive collapse of the flexible body 402'.

Figure 45:
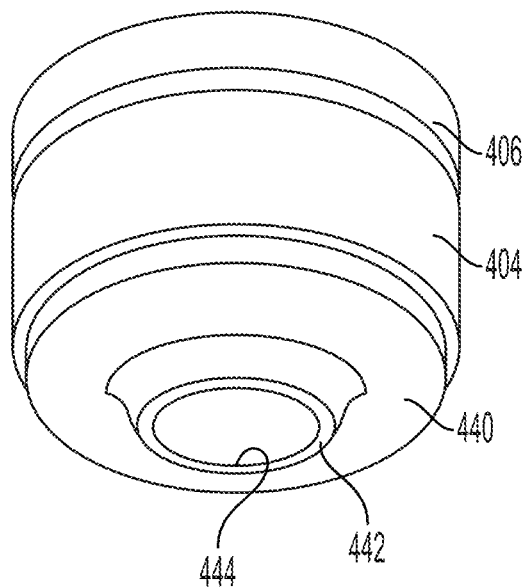
FIG. 45 shows an illustrative diagrammatic elevational isometric view of flexible body of FIG. 42 with a stop member.
Figure 46:
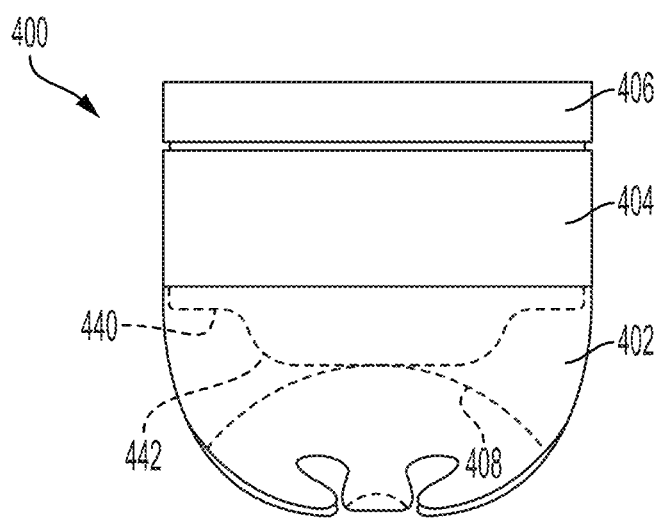
FIG. 46 shows an illustrative diagrammatic side view of flexible body and stop member of FIG. 45.

The end-effector base 404 of the end-effector 400 of FIG. 42 may further include a stop member 440 for limiting movement of the collapsible dome into the end-effector as further shown in FIG. 45. The stop member 440 may include a raised portion 442 that includes one or more apertures 444 therein to permit the flow of air at other than atmospheric therethrough (e.g., vacuum). With further reference to FIG. 46, the raised portion 442 limits the movement of the collapsible dome 408 into the end-effector, while permitting substantial flow of air at other than atmospheric pressure (e.g., vacuum) therethrough.

Those skilled in the art will appreciate that numerous modifications and variations may be made to the above disclosed embodiments without departing from the spirit and scope of the present invention.

What is claimed is:

1. An end-effector of a programmable motion device, said end-effector comprising a body including a proximal wall, a distal wall, and a flexible portion that couples the proximal wall to the distal wall, the proximal wall and the distal wall defining an open interior therebetween, the open interior being coupled to a vacuum source, and the distal wall having an outer surface adjacent a contact surface, the contact surface for contacting an object to be grasped by the end effector, the contact surface at least partially defining an aperture to the open interior of the body through which a vacuum is applied for grasping the object, and wherein the flexible portion couples the distal wall to the proximal wall such that the contact surface of the distal wall and the object are drawn upward and the outer surface of the distal wall moves to face the object when a flow of air drawn by the vacuum source through the aperture is reduced due to the aperture being at least partially blocked by the object.

2. The end-effector as claimed in claim 1, wherein the outer surface of the distal wall is curved inward towards the open interior.

3. The end-effector as claimed in claim 1, wherein the proximal wall has an upper curved surface and the outer surface of the distal wall is a lower curved surface, the upper curved surface of the proximal wall being coupled to the lower curved surface of the distal wall at the flexible portion.

4. The end-effector as claimed in claim 3, wherein the flexible portion includes a hinge portion.

5. The end-effector as claimed in claim 1, wherein the body of the end effector is formed of a compliant material.

6. The end-effector as claimed in claim 1, wherein the contact surface is circular.

7. The end-effector as claimed in claim 1, wherein the contact surface is elongated.

8. The end-effector as claimed in claim 1, wherein the contact surface is triangular.

9. An end-effector of a programmable motion device, said end-effector comprising a body including a proximal wall, a distal wall, and a flexible portion that couples the proximal wall to the distal wall, the proximal wall and the distal wall defining an open interior therebetween, the open interior being coupled to a vacuum source, and the distal wall having a curved outer surface adjacent a contact surface, the contact surface for contacting an object to be grasped by the end effector, the contact surface at least partially defining an aperture to the open interior of the body through which a vacuum is applied for grasping the object, and wherein the body further includes a flexible portion that couples the proximal wall to an intermediate portion of the distal wall such that the contact surface of the distal wall and the object are drawn upward and the outer surface of the distal wall moves to face the object when the flow of air drawn by the vacuum source through the aperture is reduced due to the aperture being at least partially blocked by the object.

10. The end-effector as claimed in claim 9, wherein the curved outer surface of the distal wall is curved inward towards the open interior.

11. The end-effector as claimed in claim 9, wherein the flexible portion includes a hinge portion.

12. The end-effector as claimed in claim 9, wherein the body of the end effector is formed of a compliant material.

13. The end-effector as claimed in claim 9, wherein the contact surface is circular.

14. The end-effector as claimed in claim 9, wherein the contact surface is elongated.

15. The end-effector as claimed in claim 9, wherein the contact surface is triangular.

16. A method of applying an end-effector of a programmable motion device to an object, said method comprising:
providing an end-effector including a body including a proximal wall, a distal wall, and a flexible portion that couples the proximal wall to the distal wall, the proximal wall and the distal wall defining an open interior therebetween, the open interior being coupled to a vacuum source, and the distal wall having an outer surface adjacent a contact surface, the contact surface for contacting an object to be grasped by the end effector, the contact surface at least partially defining an aperture to the open interior of the body;
engaging the contact surface of the distal wall to the object; and
applying a vacuum through the aperture to grasp the object,
wherein the flexible portion couples the distal wall to the proximal wall such that the contact surface of the distal wall and the object are drawn upward and the outer surface of the distal wall moves to face the object when a flow of air drawn by the vacuum source through the aperture is reduced due to the aperture being at least partially blocked by the object.

17. The method as claimed in claim 16, wherein the outer surface of the distal wall is curved inward towards the open interior.

18. The method as claimed in claim 16, wherein the body of the end effector is formed of a compliant material.

19. The method as claimed in claim 16, wherein the proximal wall has an upper curved surface and the outer surface of the distal wall is a lower curved surface, the upper curved surface of the proximal wall being coupled to the lower curved surface of the distal wall at the flexible portion.

20. The method as claimed in claim 16, wherein the flexible portion includes a hinge portion.

* * * * *